United States Patent [19]

Pattison et al.

[11] Patent Number: 5,946,375
[45] Date of Patent: *Aug. 31, 1999

[54] METHOD AND SYSTEM FOR MONITORING CALL CENTER SERVICE REPRESENTATIVES

[75] Inventors: Jon A. Pattison, Flower Mound; Paul A. Vizard; Michael J. Maloney, both of Plano, all of Tex.; David T. McCalmont, San Jose, Calif.

[73] Assignee: Teknekron Infoswitch Corporation, Fort Worth, Tex.

[*] Notice: This patent is subject to a terminal disclaimer.

[21] Appl. No.: 08/854,819

[22] Filed: May 12, 1997

Related U.S. Application Data

[63] Continuation-in-part of application No. 08/667,861, Jun. 20, 1996, Pat. No. 5,696,811, which is a continuation of application No. 08/434,261, May 3, 1995, Pat. No. 5,535,256, which is a continuation of application No. 08/126,080, Sep. 22, 1993, abandoned.

[51] Int. Cl.⁶ .................................................. H04M 3/22
[52] U.S. Cl. ........................... 379/34; 379/85; 379/88.09; 379/88.1; 379/88.25; 379/112; 379/133; 379/265
[58] Field of Search ........................... 379/34, 35, 88.22, 379/88.27, 265, 266, 309, 85, 88.09, 88.1, 88.25, 112, 133, 135

[56] References Cited

U.S. PATENT DOCUMENTS

| | | | |
|---|---|---|---|
| 4,608,638 | 8/1986 | Tsikos | 701/35 |
| 4,694,483 | 9/1987 | Cheung | 379/34 |
| 4,763,353 | 8/1988 | Canale et al. | 379/157 |
| 4,815,120 | 3/1989 | Kosich | 379/34 |
| 4,924,488 | 5/1990 | Kosich | 379/34 |
| 5,003,574 | 3/1991 | Denq et al. | 379/75 |
| 5,206,903 | 4/1993 | Kohler et al. | 379/309 |
| 5,210,789 | 5/1993 | Jeffus et al. | 379/127 |
| 5,247,569 | 9/1993 | Cave | 379/113 |
| 5,299,260 | 3/1994 | Shaio | 379/265 |
| 5,309,513 | 5/1994 | Rose | 379/265 |
| 5,317,628 | 5/1994 | Misholi et al. | 379/88 M |
| 5,418,845 | 5/1995 | Reeder | 379/213 |
| 5,465,286 | 11/1995 | Clare et al. | 379/34 |
| 5,499,291 | 3/1996 | Kepley | 379/265 |
| 5,528,678 | 6/1996 | Kaplan | 379/201 |

(List continued on next page.)

FOREIGN PATENT DOCUMENTS

| | | |
|---|---|---|
| 0140220 | 2/1987 | European Pat. Off. . |
| 0644510 | 3/1995 | European Pat. Off. .......... G07C 3/00 |
| 9209164 | 5/1992 | WIPO ............................. H04M 3/00 |

OTHER PUBLICATIONS

PCT Search Report in International Application No. PCT/US 98/09455, dated Sep. 4, 1998.

Aspect Callcenter Product Specification, Aspect Telecommunications Crop. May 23, 1988, pp. 1–1, 8–7, 8–8, 11–5 and 13–1.

Steve McNamara, "Quality Must be Seen and Heart", *Inbound/Ourbound Magazine*, Dec. 1989, pp. 66–67.

Madeline Bodin, "Keeping and Eye on Your Agents", *Call Center Magazine* Feb. 1993, pp. 32–34.

Aspect CallCenter Product Specification, Aspect Telecommunications Corp. May 23, 1988, pp. 1–1, 8–7, 8–8, 11–5 and 13–1.

*Primary Examiner*—Krista Zele
*Assistant Examiner*—Roland G. Foster
*Attorney, Agent, or Firm*—Baker & Botts, L.L.P.

[57] ABSTRACT

A method and system permit monitoring of a call center agent or similar service representative in servicing calls in a call center by logging sessions. The logged sessions may be selectively played back based on a number of scheduling criteria, including time interval, a scheduling rule, a number of calls, a monitoring length, a random indicator, call type information, agent performance level information, call traffic information, and others. The method and system plays back those portions of the logged sessions that meet the scheduling criteria.

26 Claims, 11 Drawing Sheets

U.S. PATENT DOCUMENTS

| | | | |
|---|---|---|---|
| 5,530,744 | 6/1996 | Charalambous et al. | 379/265 |
| 5,535,256 | 7/1996 | Maloney et al. | 379/34 |
| 5,537,470 | 7/1996 | Lee | 379/266 |
| 5,621,789 | 4/1997 | McCalmont et al. | 379/265 |
| 5,696,811 | 12/1997 | Maloney et al. | 379/34 |
| 5,699,412 | 12/1997 | Polcyn | 379/89 |
| 5,703,943 | 12/1997 | Otto | 379/265 |
| 5,715,307 | 2/1998 | Zazzera | 379/265 |
| 5,790,650 | 8/1998 | Dunn et al. | 379/265 |
| 5,818,907 | 10/1998 | Maloney et al. | 379/34 |
| 5,825,869 | 10/1998 | Brooks et al. | 379/265 |
| 5,828,747 | 10/1998 | Fisher et al. | 379/309 |

```
AGENT GROUP: ____  ←―42           44
                                   ↙       50            52
SUPERVISOR AUTHORIZATION                    ↙             ↙
                     48
SUPERVISOR   46      ID#          PASSWORD       SUBGROUP
            ↙
KATHY HELPSTER       32323239     392920393      1,2,4
MIKE TOLLER          392039  54   3939220        3    62
                            ↙              60         ↙
MONITORING PERIODS         58              ↙
                          ↙             # OF      MAXIMUM
        56
PERIOD # ↙         TIME INTERVAL        CALLS     LENGTH
   1                 8:00-12:00           5         20
   2                 8:00-17:00           8         30
   3                12:00-17:00           4   64    20
                                              ↙
MONTHLY MONITORING SCHEDULE FOR MONTH: JANUARY        72
                   66                                  ↙
       68   70
        ↙   ↙   ***** MONITORING PERIOD TO USE *****

AGENT         SG    MON   TUE   WED   THU   FRI   SAT   SUN
TOM JONES     1     1                  2
TOM JONES     1     3
MARY SMITH    2           1                 1     3
```

FIG. 2

```
              MONTHLY AGENT MONITORED REPORT
                       JUNE 1992
                DATE GENERATED: JUNE 30, 1992     82
       84       PERIOD COVERED: JUNE 01 TO 30
        ↙   88  90       92            94         96        98
AGENT GROUP 01  ↙         ↙             ↙          ↙         ↙
86→AGENT     SG  EXT.   DAY MONITORED  TIME MONITORED  DURATION  # CALLS

TOM JONES    1   123    JUNE  2       08:22           10        3
                        JUNE  6       13:22           15        6
                        JUNE 30       10:12           10        4

MARY SMITH   2   222    JUNE  2       10:22           16        5
                        JUNE  5       15:33           12        8
                        JUNE 30       09:56            5        3

SUE LISTER   3   789    JUNE  1       11:22           10        3
                        JUNE  4       14:41           11        5
                        JUNE  4       17:32           33       11
                        JUNE 30       08:12           14        8
```

FIG. 3

| MONITORING PERIODS | | | | | | | | |
|---|---|---|---|---|---|---|---|---|
| | PERIOD NUMBER | INTERVAL | RULE | NUMBER OF CALLS | LENGTH | RANDOM | CALL TYPE | PERF LEVEL | CALL TRAFFIC |
| 720 | 1 | 8:00–12:00 | 1 | 5 | | Y | 1 | <80 | |
| | 2 | 8:33–12:33 | 2 | | >30 | N | | >50 | 1 |
| | 3 | 12:00–17:00 | 3 | 5 | <30 | Y | | | |
| | 4 | 8:00–12:00 | 4 | 5 | >30 | N | | | |
| 722 | 5 | | 1 | 10 | | | 2 | | 2 |
| | 6 | | 2 | | >20 | | | <80 | |
| | 7 | | 3 | 5 | <30 | | 3 | | 1 |
| | 8 | | | | | | 4 | | |

| AGENT SCHEDULES | MON | TUE | WED | THUR | FRI | SAT | SUN |
|---|---|---|---|---|---|---|---|
| TOM | 1 | 1 | 1 | | | | |
| BILL | 1 | 2 | | | | | |
| JANE | 3 | 4 | | | 3 | 4 | |
| MARY | 1,6 | 6 | 6 | 3,6 | 6 | 6 | 5,6 |
| FRANK | 8 | 8 | | | | | |
| JILL | | | | 8 | 8 | | |

# METHOD AND SYSTEM FOR MONITORING CALL CENTER SERVICE REPRESENTATIVES

CROSS REFERENCE TO RELATED APPLICATIONS

This application is a continuation-in-part application of U.S. application Ser. No. 08/667,861, filed Jun. 20, 1996 by Michael J. Maloney and David T. McCalmont, now U.S. Pat. No. 5,696,811, which is a continuation of application Ser. No. 08/434,261, filed May 3, 1995 by Michael J. Maloney and David T. McCalmont, now U.S. Pat. No. 5,535,256, issued Jul. 9, 1996, which is a continuation of application Ser. No. 08/126,080, filed Sep. 22, 1993 by Michael J. Maloney and David T. McCalmont, now abandoned.

This application is related to U.S. application Ser. No. 08/854,435, filed May 12, 1997 by Jon A. Pattison, Paul A. Vizard, Michael J. Maloney, and David T. McCalmont, pending.

TECHNICAL FIELD OF THE INVENTION

The present invention generally relates to telecommunications systems and methods. More particularly, the present invention pertains to a method and system for automatically monitoring the performance of call center service representatives.

BACKGROUND OF THE INVENTION

Call centers provide a wide array of services for customers of the companies that use them. Through a call center, a company can service customers around the world, around the clock. The essence of call center effectiveness and efficiency, however, is the performance of the call center service representatives or agents that serve the calling customers. Call center supervisors manage call service representatives and are responsible for monitoring their performance. Call center supervisors may monitor service representatives' calls for three reasons: (1) to provide training to the customer service representatives, (2) to assure the quality of customer service, and (3) to maintain security within the company.

For a call center that uses an automatic call distributor (ACD), private branch exchange (PBX), or other suitable routing device, there typically exist features that are integral to the ACD that enable monitoring of service representative performance. These capabilities, however, are generally manual and have significant limitations. With other demands on their time and attention, supervisors may not be consistent or equitable in the ways that they monitor each agent. These inconsistencies and inequities may result in a supervisor monitoring an agent either for too little time or too much time, or too infrequently or too frequently. This may cause an imbalance in the supervisor's perception of an agent relative to other agents in the call center.

Another problem that manual scheduling and monitoring of agents causes is increased time pressure on the supervisors themselves. For example, they must remember who has been monitored, for how long they have monitored or intend to monitor an agent, and when to monitor the agent. If a call center has numerous service representatives, the requirement to monitor the performance of these agents may seriously and adversely affect the productivity of the call center supervisor. This is because the task of monitoring agents is only one of many tasks that the supervisor must perform.

SUMMARY OF THE INVENTION

There is a need for a method and system that ensures consistency and equity across all agents, that provides a fair system for evaluating each agent's performance in servicing customer calls, and that offers flexible and varied scheduling criteria for monitoring the agents. The present invention, accordingly, provides a method and a system for scheduling and monitoring agents in a call center that overcome or reduce disadvantages and limitations associated with prior agent monitoring methods and systems.

In one embodiment of the present invention, a system for monitoring a plurality of service representatives in handling customer calls includes a switching device that receives customer calls. A number of agent workstations coupled to the switching device receive customer calls from the switching device. A platform coupled to the switching device records customer calls as a plurality of logged sessions and determines service representative monitoring periods having scheduling criteria. The platform selects portions of the logged sessions that meet the scheduling criteria of the monitoring periods.

A technical advantage of the present invention is that it eliminates the need for a supervisor to remember when, who, how often, and for how long to monitor an agent. This frees the supervisor from the task of keeping track of when to monitor the agents. It reduces the pressure on supervisors, while at the same time increases their productivity. The present invention also ensures consistency and equity among all agents, and provides techniques for monitoring agent performance using a wide variety of scheduling criteria.

Another technical advantage of the present invention is that it records each of the monitored sessions for later play back by the call center supervisor or recorded agent. If the call center supervisor desires, the agent may be notified of the upcoming monitored session. This may be important, since legislation, company procedures, or other directives may require the call center supervisor to notify a call center agent that the call is being monitored.

Another technical advantage of the present invention is that by recording the monitoring sessions, the call center supervisor may review the session at his or her convenience. In one embodiment of the invention, recorded messages are stored on disk, rather than on tape. This permits recorded comments to be inserted easily into the recorded session by other call center supervisors for future reference as well as for later review by the monitored call center agent. Storing the monitoring sessions on disk permits the supervisor to delete selected monitoring sessions. Alternatively, the present invention may record or log all sessions, and selectively play back portions of the logged sessions in accordance with a wide variety of scheduling criteria offered by the system. Therefore, the present invention provides both selective recording and selective play back of logged sessions.

Another technical advantage of the present invention is the use of a wide variety of scheduling criteria to establish monitoring schedules for the agents. These criteria may include a variety of scheduling rules based on the number of calls to monitor, the maximum or minimum length of the monitoring time, the number of periods in which to monitor the agent, and whether the calls and periods are to be randomly scheduled throughout the available interval in which the agent is handling customer calls. Moreover, the present invention provides additional scheduling criteria that allow monitoring based on the call type, performance level of the agent, current call traffic at the call center, or other factors and criteria. Using these and other factors, the present invention can establish monitoring schedules and dynamically alter those schedules depending on the operation of the call center.

Another technical advantage of the present invention is the monitoring, storing, and play back of both voice and data associated with a session. For example, a voice call received at a call center may be associated with a screen shot or other data displayed on the agent's screen. Other types of data may also be included or associated with a voice call or a data only session, such as an interaction over a global computer network such as the Internet. The present invention contemplates monitoring sessions or calls that may include voice, data, or both voice and data.

Another technical advantage of the present invention is that it automatically provides reports of the monitoring activity within the call center. This provides proof of and accountability for each of the monitored sessions. Therefore, the method and system of the present invention easily and reliably automate the process of scheduling monitoring sessions for call center service representatives.

BRIEF DESCRIPTION OF THE DRAWINGS

The functions and modes of use and advantages of the present invention are best understood by reference to the following description of illustrative embodiments when read in conjunction with the accompanying drawings, wherein:

FIG. 2 illustrates an exemplary screen for programming pre-determined intervals, the number of calls in each interval, the maximum length of monitoring sessions, and other aspects of the monitoring schedules;

FIG. 3 is a report screen illustrating the results of the monitoring sessions;

DETAILED DESCRIPTION OF THE INVENTION

Figure 1:
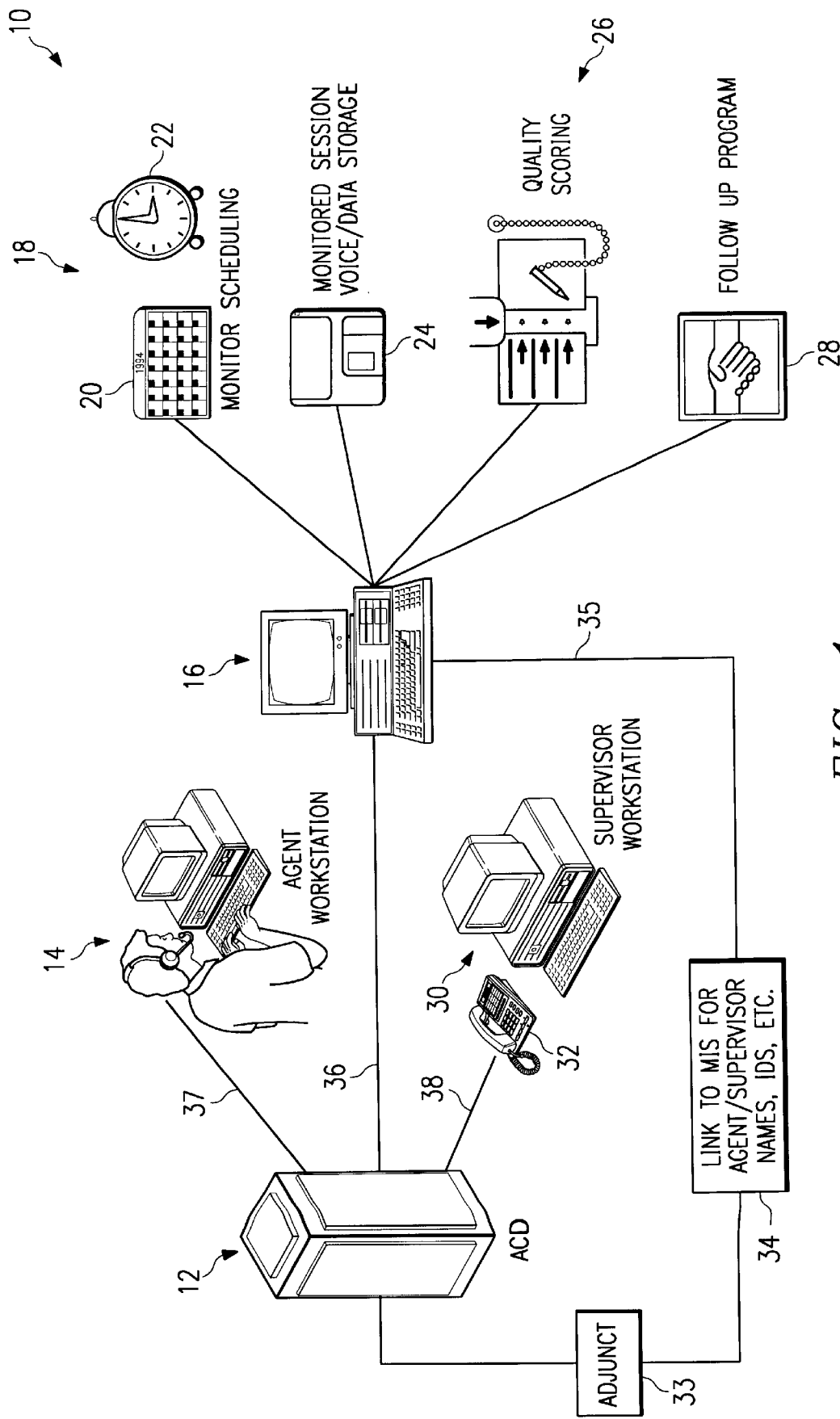
FIG. 1 provides a schematic block diagram of the monitoring system as it may be used within a call center.

FIG. 1 shows an environment 10 that is a portion of a call center for practicing the present invention. In the call center environment 10, calls may originate through a switching device such as an ACD, PBX, or other voice, data, or voice and data switching or routing equipment (referred to generally as ACD 12) for delivery to an agent or call service workstation 14 operated by an agent or service representative. Workstation 14 comprises one or more output devices, such as a display or speaker; one or more input devices, such as a keyboard or mouse; a voice instrument, such as a telephone; and any other device that provides voice/data communication. A platform 16 connects to ACD 12 and includes the necessary controls and software instructions for performing the various functions of environment 10. For illustrative purposes, a set of icons in FIG. 1 describe the functions of environment 10. For example, icon set 18 includes calendar icon 20 and clock icon 22 to represent the scheduling function; diskette icon 24 represents the monitored session voice and data storage that can record selected sessions or all sessions as a "logger"; notebook icon 26 represents the quality scoring function that can determine agent performance information; and icon 28 represents the result of a supervisor being able to follow up with the call center agent and improve the agent's overall performance quality.

Environment 10 contemplates calls or sessions that include voice, data, or voice and data. For example, calls received over telephone switching equipment may include voice conversations, but may also include associated data provided with the call or generated in environment 10. In another embodiment, data switching or routing equipment may provide a purely data session for processing by environment 10. For example, a data session over a global computer network, such as the Internet, may be scheduled, monitored, stored, and evaluated using environment 10. For purposes of this discussion, the terms "session" and "call" contemplate voice only, data only, or both voice and data transactions, and the term "voice/data" contemplates voice only, data only, or both voice and data.

Within environment 10, supervisor workstation 30 represents the automatic scheduling and monitoring system functions provided to a supervisor or other authorized person. Supervisor workstation 30 comprises similar voice/data communication components as agent workstation 14. Icon 32 represents the supervisor telephone or other voice instrument connected to ACD 12 that is used to monitor sessions. An adjunct 33 is coupled to ACD 12. Adjunct 33 comprises a workforce management system, contact control server, computer telephony integration (CTI) application or platform, or other adjunct device accessible by platform 16 to perform call center functions. Adjunct 33 may be implemented in an on-site or remote mainframe, workstation, personal computer, or other device that includes sufficient processing and storage capacity.

Block 34 represents the link between platform 16, adjunct 33, and other components of the call center's management information system (MIS) host for obtaining agent and supervisor names, identification numbers, expected agent schedules, customer information, or any other information relating to the operation of the call center. Block 34 includes wireline or wireless communication links between local and remotely located components of the call center. U.S. Pat. No. 5,555,299 discloses a suitable arrangement of call center components to provide handling and processing of voice/data sessions, and is hereby incorporated by reference.

The various components illustrated in FIG. 1 communicate information that allow for the automatic scheduling and monitoring functions. As described above, block 34 communicates with platform 16 using link 35 to provide agent and supervisor names, identification numbers, expected agents schedules, customer information, or any other information relating to the operation of call center. Similarly, platform 16 communicates with ACD 12 using link 36. Link 36 supports a variety of voice/data channels that allow platform 16 to monitor and record voice/data associated with customer calls received at ACD 12. Also, platform 16 receives over link 36 information regarding the operation of ACD 12 and the handling of calls received at the call center. This information may include call set-up information, traffic statistics, data on individual calls and call types, automatic number identification (ANI) information, other computer telephony integration (CTI) information, or other information that may be used by platform 16 to provide static or dynamic scheduling of sessions for agents in the call center. ACD 12 receives instructions over link 36 that directs the interconnection of various calls received at the call center to selected agents depending on the automatic scheduling and monitoring functions performed by platform 16. Link 37 between ACD 12 and agent workstation 14 communicates voice/data associated with a monitored session, as well as agent identification and attendance information used in workforce management scheduling by platform 16. For example, as each agent logs in or logs off an associated agent workstation 14, platform 16 receives the agent identifier over link 36 to enable scheduling based on the currently available workforce of agents in the call center.

The automatic scheduling and monitoring system of environment 10 is a voice/data processing application that frees the supervisor from the worrisome and time-consuming task of keeping track of when agents need to be monitored and records the monitoring session as scheduled. This permits a supervisor to establish the monitoring schedule, load the schedule into platform 16, and then monitor sessions at the supervisor's convenience using supervisor workstation 30 and/or voice instrument 32 (or a remote workstation and/or voice instrument) that may include a speaker phone.

In FIG. 2, monitor schedule screen 40 shows the data input that a call center supervisor would provide for automatically scheduling and monitoring the performance of call center agents. In particular, position 42 permits the system administrator to input the agent group number where monitoring is to occur, and position 44 permits the system administrator to enter authorized supervisor names at position 46, supervisor identification numbers at position 48, supervisor passwords at position 50, and subgroups at position 52 for the various supervisors that have authorization to monitor within the group. Monitoring periods block 54 permits the system administrator to identify the periods for monitoring at position 56, the time interval for monitoring at position 58, the number of calls to monitor in the period at position 60, and the maximum length of the monitoring period at position 62.

As illustrated by positions 58, 60, and 62, a monitoring period can be defined by, among other things, a combination of the time interval to monitor the agent, the number of calls to be monitored, and the maximum monitoring length. Various scheduling rules and scheduling criteria can be combined to provide flexible monitoring control. In one mode, the user can specify the number of calls or the maximum monitoring length. In another mode, both the number of calls and the maximum monitoring length may be specified. In this embodiment, the system monitors the agent for the specified number of calls as long as the monitoring length does not exceed the maximum length. If the monitoring length exceeds the specified maximum length, then the system either immediately stops or completes recording of the current call and stops. As described below in more detail, the recording of calls can be done in a random manner. The scheduling rules discussed above are exemplary, and many other rules and criteria can be used, as discussed in more detail below with reference to FIGS. 12 and 13.

Position 64 permits the call center supervisor to specify the month for which the monthly monitoring schedule is being established. In space 66 appears a weekly or monthly calendar to establish the monitoring periods for the individual call center agents. For example, at position 68 the supervisor can input the name of the call center agent that the supervisor desires to be monitored. At position 70, the supervisor may designate the subgroup to which the agent belongs. In position 72, the supervisor may identify, for each agent, the day of the week within the month, and the period during which the agent is to be monitored. The system, therefore, permits the call center supervisor or other authorized operator to assign the monitoring periods and associate them with a combination of the time interval to monitor, the number of calls to monitor, and the maximum length for monitoring.

When the time period ends or a specified maximum length for monitoring is reached during a monitoring session and the agent is in the middle of a call, the system can either continue to monitor the call until the agent completes the call or terminate the call immediately. The monitoring schedule may consist of up to 24 months, as established for each agent by the call center supervisor. This may be done by assigning one or more of the monitoring periods to any number of days within each month.

In FIG. 2, the name "TOM JONES" appears twice. This is to illustrate that a call center supervisor may direct the system of the preferred embodiment to monitor the agent multiple times or using multiple scheduling criteria within a single day. The supervisors whose names appear in position 46 of monitoring schedule screen 40 are authorized to monitor sessions for the call center agents in the subgroups designated at respective positions 52. Moreover, the system may be configured to allow agents to monitor the sessions they handled.

In a particular embodiment, the automatic scheduling and monitoring system may randomly schedule the monitoring session of an agent during the specified monitoring period. For example, if an agent is scheduled to be monitored between 8:00 a.m. and 11:00 a.m., the system can randomly select one or more time slots within the specified three-hour window to perform the monitoring. Agents are then monitored for the numbers of calls and/or the maximum duration of the assigned monitoring period specified in positions 60 and 62. Also, platform 16 may establish schedules for monitored agents—with or without random scheduling—while taking into account the established monitoring periods specified in position 54, the channel or storage capacity of platform 16, as well as other considerations to effectively fit all scheduled monitoring sessions into the specified scheduling criteria.

FIG. 3 shows an exemplary monthly agent monitored report screen 80. For example, header 82 specifies the title of the screen as being the "MONTHLY AGENT MONITORED REPORT" for June 1992. Header 82 further specifies the date that report screen 80 is being generated as well as the period that the report covers. Screen 80 further indicates at position 84 the agent group pertaining to the report. At column 86 appears the name of each agent that the report includes. Column 88 provides the subgroup to which the agent belongs and column 90 specifies the agent's extension. Column 92 identifies the days on which the agent was monitored. Column 94 identifies the time that the agent was monitored. Column 96 specifies the duration of the monitoring session, and column 98 specifies the number of calls monitored.

The automatic scheduling and monitoring system also has the ability to produce a daily agent monitor report that lists the agents that the system monitored. Thus, the system displays, by group, the time of day that monitoring occurred together with the computer filename associated with the monitored session. The supervisor may print this report as well as write it to disk at the end of the day. The monthly agent monitor report uses the daily agent monitor report to provide its list of monitored agents.

Monitoring sessions may be either "silent" or may include a beep tone that the agent hears, a screen display or icon that the agent can see, or other monitoring indicator. Therefore, depending on how the call center supervisor desires to or must operate (i.e., as matter of complying with certain laws, regulations, or corporate policies that govern monitoring), the call center agent can either be aware or unaware that the call is being recorded. Additionally, the system may be configured to send a message (e.g., verbal message, textual message, electronic mail) to notify the agent that monitoring will be taking place. These messages may be provided by the agent workstation or handset at the beginning of a scheduled monitoring period or just prior to the first call to be monitored.

If an agent is not signed on when the system tries to monitor him or her, the system may attempt to monitor the agent at successive fifteen-minute intervals following the initial attempt until the end of the specified monitoring period. The monitoring sessions that are missed due to an agent not being signed on during the monitoring period will be noted on the agent monitored report. Alternatively, platform 16 may receive an indication of agent sign on from ACD 12 over link 36, and immediately begin monitoring calls of the agent.

Supervisors may "log on" to the system with the identification number and password specified in monitor scheduling screen 40 for the appropriate agent group. The supervisor may log on by entering digits from, for example, a numeric keypad such as that associated with voice instrument 32 or using a keyboard or other input device of supervisor workstation 30. In providing a way for playing back the results of the monitored session, the system verifies access by the supervisor and permits the supervisor to monitor in real-time all sessions or to specify a particular session for play back. In doing this, the call center supervisor may specify the recorded session that he/she desires to play back, and the system will then retrieve the recorded session. Each recorded session has an associated time stamp that describes when the recording started and the number of minutes of monitoring that were actually recorded.

Normally recorded session play back is at the same speed as the actual voice/data transaction. Supervisors may, however, elect to speed up the play back by depressing a key on voice instrument 32 or workstation 30. The preferred embodiment permits increasing the play back speed in increments up to approximately a double speed (e.g., a ten-minute segment of recorded voice/data may be played back in a compressed period of five minutes). Accelerated play back may be slowed down in increments to a normal speed or less than the normal speed by pressing another key. Additionally, call center supervisors may elect to "jump back" or "skip ahead" in ten-second or other user defined increments, or skip over the session completely.

Once a call center supervisor monitors a recorded session, the supervisor may elect to save or erase the recording. Supervisors may also annotate each monitored session by recording any number of voice/data messages that become inserted into the recording. These voice/data annotations may then be used when passing the recorded call to another supervisor or for commentary when the supervisor plays back the call during a coaching session with the call center agent. The supervisor may annotate each monitored call once or several times.

The voice component of monitored sessions is digitized and compressed at between 9,600 to 32,000 bits per second (bps) and then stored on disk. However, the digitization rate of 24,000 bps offers satisfactory fidelity recording and minimizes the amount of disk required to store the monitored session. The data component of the monitored session may be digital data representing a screen shot, display content, or other data associated with the session. The amount of data recorded for each session depends on the particular application, the resolution and graphical components of the display, and other factors. In a particular embodiment, the voice/data of the monitored session is stored in a digital format in random access memory (RAM), fixed or removable magnetic or optical media, or any other suitable digital storage facility. The voice/data of a monitored session may be maintained in a single file, multiple files, or in any other appropriate configuration.

The system will verify that sufficient disk space remains prior to beginning a monitoring session. If there is insufficient disk space to complete the scheduled session, the preferred embodiment displays an "OUT OF DISK SPACE" message on system monitoring report 80, and produces an error output for an associated error log at a system printer. The call center system administrator may then delete old recorded sessions to free necessary disk space. Monitoring sessions missed because of insufficient disk space, in the preferred embodiment, will not be retroactively invoked once disk space is made available.

The system utilizes a number of configured voice/data channels or ports to perform the monitored session. For example, ACD 12, agent workstation 14, platform 16, supervisor workstation 30, and adjunct 33 may support voice/data channels using an integrated services digital network (ISDN) or other suitable switching and routing equipment and protocols. U.S. Pat. No. 5,555,299 discloses one such configuration that supports a variety of voice/data channels in a call center environment.

Multiple voice/data channels may be configured for monitoring and play back of the monitored sessions to the call center supervisor. Individual voice/data channels may be configured for monitoring only, play back only, or for both monitoring and play back. When channels are configured for both monitoring and play back, call center supervisors who desire to monitor sessions may need to "camp on" or queue up for an available channel. However, once a channel completes a monitoring session, it will wait momentarily before establishing the next monitoring session so that supervisors may access the system.

Having described the general system overview and interface communication between the system and user, the following description outlines in more detail the system architecture, operation flow, software control flow, software module descriptions, inter-process communications, database and data structure definitions, as well as exemplary implementation details for the system.

The present invention may be implemented using a variety of system hardware and system software. An exemplary system architecture 100 includes processor 102 that may be a personal computer, mini-computer, mainframe computer, or other hardware implementation that includes data processing capability. Processor 102 is coupled to memory 104 that may include random access memory (RAM), read-only memory (ROM), CD-ROM, fixed or removable magnetic or optical media, or any other volatile or non-volatile storage media. Memory 104 may be integral to or separate from platform 16 and may comprise multiple media located at multiple sites within or outside of the call center. Processor 102 operates under an operating system 106, such as DOS, WINDOWS®, UNIX, or other suitable operating system. Drivers 108 supported by operating system 106 may be a dynamic link library (DLL) or other suitable driving software that control the operation of voice/data cards 110. The voice/data cards 100 provides connectivity from platform 16 to other components in the call center, such as ACD 12 and adjunct 33.

In a particular embodiment of architecture 100, processor 102 comprises a personal computer and operating system 106 that supports a graphical user interface, such as a WINDOWS, MACINTOSH, UNIX, or other computing environment. Drivers 108 and application program 112, may include modules, routines, and application interfaces for integrating a variety of voice and data in the call center environment, such as a telephone application programming interface (TAPI), a telephony server application programming interface (TSAPI), a dynamic data exchange (DDE), computer telephony integration (CTI) routines, or any other suitable software routine that can integrate computers and telephones in a voice/data applications environment. For example, voice/data integration and communication between platform 16 and ACD 12 may be accomplished by a standardized CTI gateway or open standards-based call control server technology, such as CT-CONNECT developed by DIALOGIC or the telephony API (TAPI) developed by INTEL and MICROSOFT. The present invention contemplates any suitable arrangement of hardware and software that allows CTI communication and voice/data support and integration between ACD 12, platform 16, and adjunct 33.

Remote access to the system is permitted by block 114 using communication link 116, which may include a serial or parallel port and associated software. Information in hard disk 104 may be accessed and stored using a database interface 118. Furthermore, hard disk 104 may use a backup 120, such as a backup tape, to ensure the integrity of stored voice/data sessions or to enhance the storage capacity, such as in the logger embodiment. Communication link 116 connects to modem 122 and MIS host 124 that may include portions of ACD 12, adjunct 33, or other servers and hosts in the call center. System architecture 100 may also include communication link 126, such as a parallel or serial port, that connects to printer 128. Voice/data cards 110 connect to ports 130 of ACD 12. ACD 12 provides voice/data communication paths to the call center supervisor as indicated by triangle 132 as well as to the call service representatives or agents as indicated by triangles 134 and 136.

Figure 5:
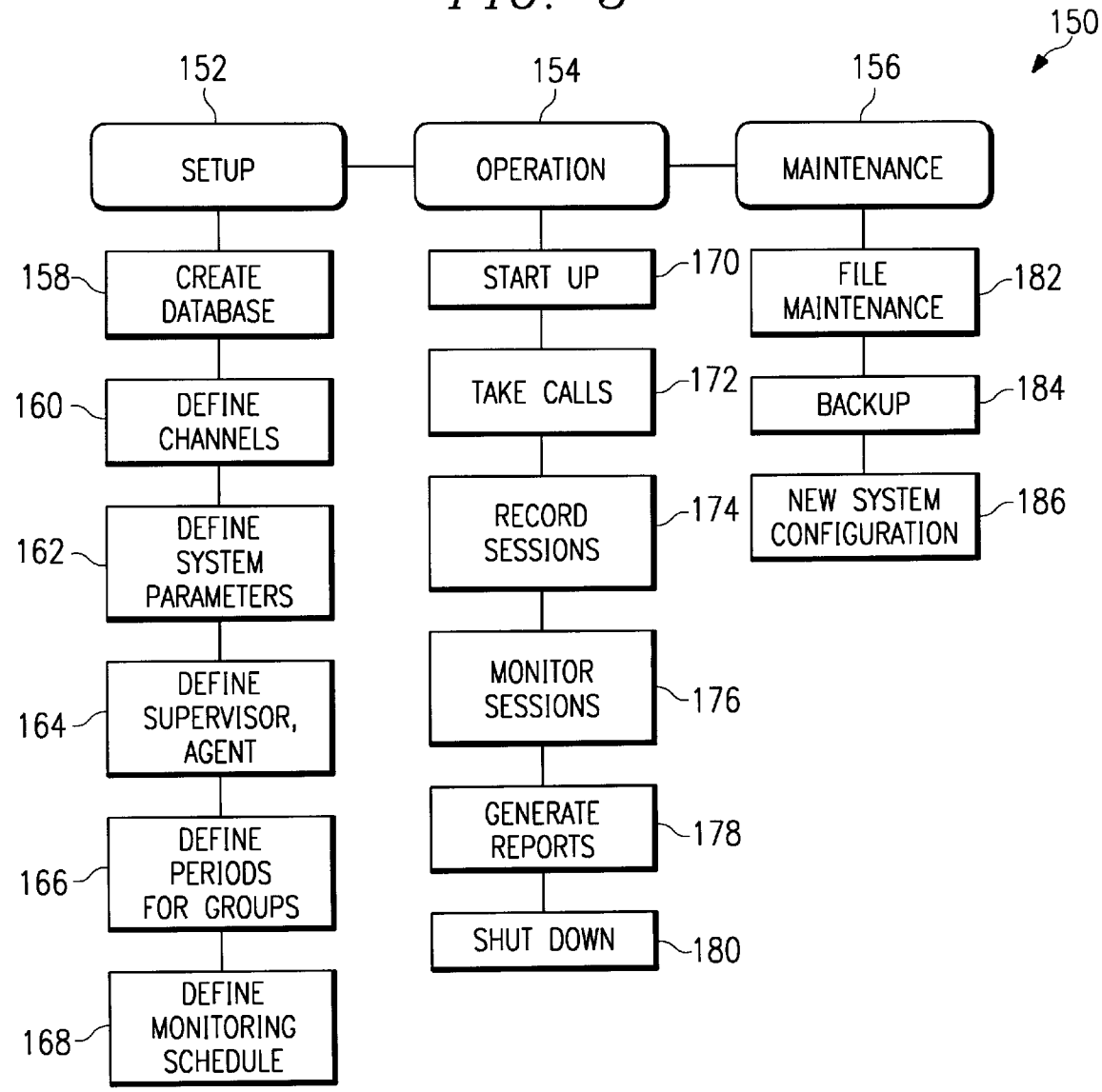
FIG. 5 is an application block diagram for the system.

FIG. 5 shows the application block diagram 150 for the automated scheduling and monitoring system. The system of the present invention includes three basic modes of operation including set-up mode 152, operation mode 154, and maintenance mode 156. Set-up mode 152 includes the functions of creating the database as block 158 indicates, defining channels or ports within the system as block 160 indicates, defining system parameters as block 162 indicates, and defining the supervisors and agents as block 164 indicates. Set-up mode 152 also includes the functions of defining periods for groups as block 166 indicates and defining monitoring schedules as block 168 indicates. As discussed above and below with reference to FIGS. 12 and 13, blocks 166 and 168 contemplate a variety of dynamic and static scheduling possibilities based on a number of different scheduling criteria.

Operation mode 154 includes the functions of system startup as block 170 represents, monitoring for agents to take calls as block 172 indicates, recording sessions as block 174 indicates, monitoring or playing back sessions as block 176 indicates, generating reports as block 178 illustrates, and shutting down as block 180 illustrates. Block 174 contemplates selectively recording particular sessions or, in the case of a logger, recording all sessions for selective play back. Block 176 contemplates monitoring sessions either by the supervisor or selected agents.

Maintenance mode 156 includes the functions of voice/data file maintenance represented by block 182, backup as block 184 illustrates, and new system configuration per block 186.

Figure 6:
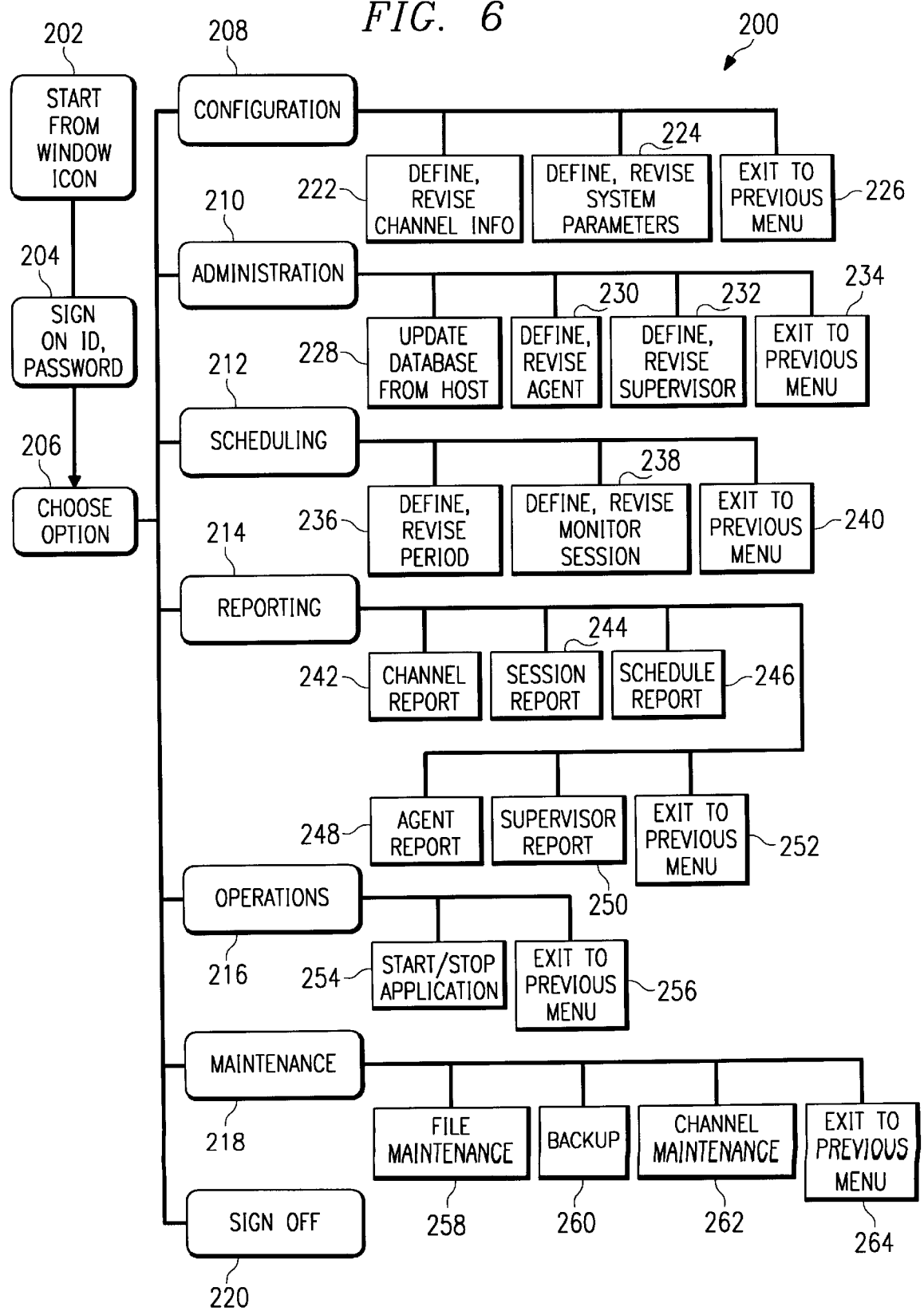
FIG. 6 is a hierarchical interface block diagram for the system.

The following discussion illustrates how the system performs the above-listed functions in the different modes of operation. Referring to FIG. 6, there is shown interface block diagram 200 as a hierarchical illustration of the user interfaces that the system provides. Beginning at icon access block 202, a user may access the functions of the system through an icon in the graphical user interface of the computing environment supported by processor 102 and operating system 106. After selecting the icon or otherwise initiating execution of application program 112, the next step is to sign on to the system using a password or similar access mechanism as password block 204 indicates. Next, the user has the ability to chose an option to operate various aspects of the system. Choice block 206 illustrates the function of permitting the user to choose among the various options. The various options include configuration option 208, administration option 210, scheduling option 212, reporting option 214, operations option 216, maintenance option 218, and sign-off option 220.

Configuration option 208 includes the functions of defining and revising channel information as block 222 illustrates, defining and revising system parameters as block 224 represents, and exiting to the previous menu as block 226 illustrates. Administration option 210 includes the functions of updating the database from the host as block 228 indicates, defining and revising the agent as block 230 represents, defining and revising the supervisor as block 232 indicates, and exiting to the previous menu as block 234 shows. Scheduling option 212 includes the functions of defining and revising monitoring periods as block 236 indicates, defining and revising the monitor session as block 238 represents, and exiting to the previous menu as block 240 shows. Some of the criteria for performing the scheduling function of block 212 have been disclosed with reference to FIGS. 2 and 3, and additional scheduling criteria and functionality are discussed below with reference to FIGS. 12 and 13.

Reporting option 214 includes a variety of functions that provide reports to the user. These include a channel report, a session report, a schedule report, an agent report, and a supervisor report as respective blocks 242, 244, 246, 248, and 250 illustrate. Reporting option 214 also permits the user to exit to the previous menu per block 252. Operations option 216 includes the start/stop function for the system as block 254 represents and exiting to the previous menu as block 256 indicates. Maintenance option 218 includes the functions of maintaining the voice/data files as function block 258 represents, back-up as block 260 represents, channel maintenance as block 262 indicates, and exiting to the previous menu as block 264 shows.

An important aspect of the functions of the system is the various reports that the supervisor may receive. These reports provide easy-to-understand information that no prior system provides. For example, in report option 214, reports may be generated for display as well as for a paper copy. The reports from reporting option 214 are described as follows:

The channel report associated with block 242 contains information pertaining to voice/data channels. This report includes the computer port that the preferred embodiment is using, the device name, if any, the type, the usage of either recording or play back, the latest state, and possible trouble counts.

The session report of block 244 is by group, subgroup, and extension. This report contains all recorded session logs. It can be requested for those sessions not yet monitored and their expected file length (in minutes and seconds) or for those existing voice/data files regardless of whether they have been monitored with the play indication in addition to file length. Alternatively, all sessions that have been recorded, including those deleted, can be reported in the session report. Furthermore, the session report of block 244 may include the supervisor's identity who deleted the session, the date that the voice/data file was deleted and the filename and length of still accessible sessions.

The schedule report of block 246 illustrates monitoring sessions scheduled by group, subgroup, and extension. It is available monthly, weekly or daily and lists all extensions and monitoring periods associated with each extension. In addition, the scheduling report includes the relevant scheduling criteria to establish different monitoring periods for selected agents. Exemplary scheduling reports and the information that they may contain is described with reference to FIGS. 2 and 13.

The agent report of block 248 contains agent information such as group number, subgroup number, identifier, name, and extension. The agent report may be for all groups or a particular group. The supervisor report of block 250 contains supervisor information such as the supervisor's group number, authorized subgroups, identifier, and name. For the supervisor report, the password will be encrypted on the screen display.

Figure 7:
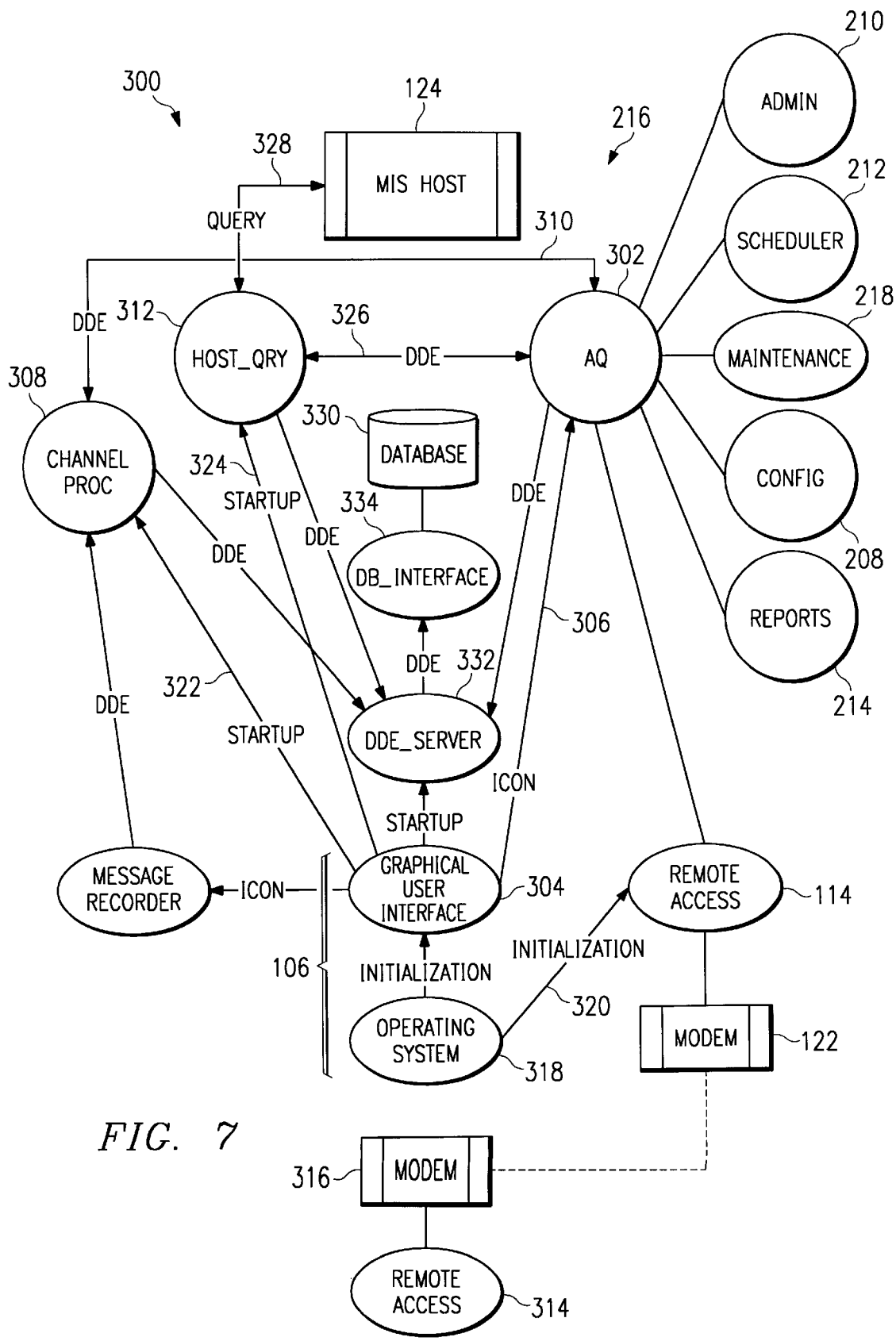
FIG. 7 provides a process control flow diagram for the system.

FIG. 7 shows process control flow diagram 300. In process control flow diagram 300, aq program 302 represents an important part of the system. For example, aq program 302 permits the user to choose among the options listed in user interface block diagram 200 of FIG. 6. That is, through aq program 302, a user has the ability to direct process control to administration option 210, scheduling option 212, maintenance option 218, configuration option 208, and reporting option 214. Additionally, through aq program 302, the user has the ability to use the operations option, as indicated generally by arrow 216. Also, process flow diagram includes database 330, which may be part of memory 104 and can store agent schedules, monitoring periods, scheduling criteria, system queues, voice/data associated with sessions, and other information concerning the operation of ACD 12, platform 16, or adjunct 33.

Figure 4:
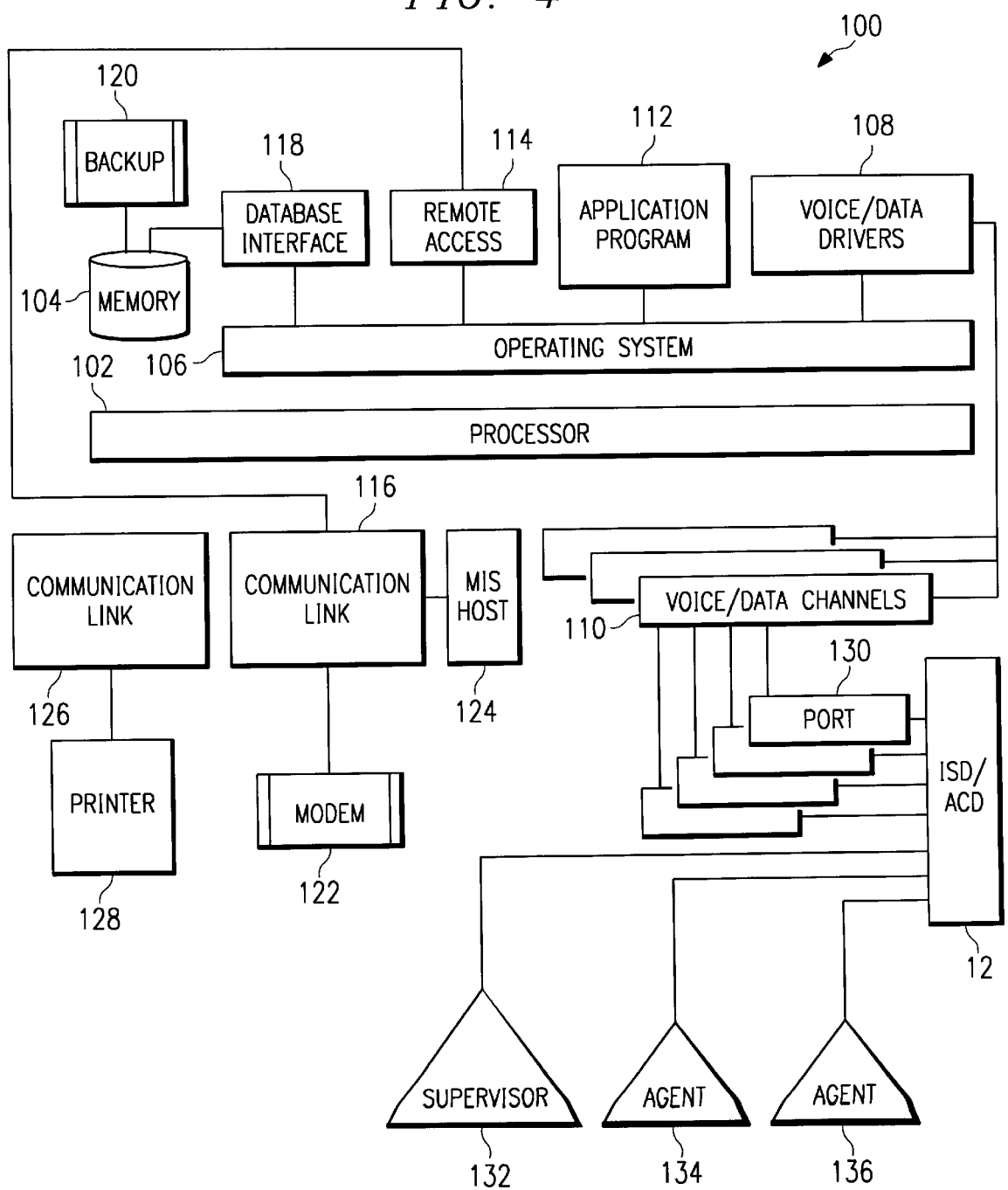
FIG. 4 provides a conceptual block diagram of a hardware and software configuration for the system.

The following discussion further details process control flow within the operations option 216. The system uses graphical user interface 304 to access aq program 302 through an icon as icon arrow 306 represents. Monitoring and play back sessions are performed by a channel processing program herein called channel_proc program 308. The channel_proc program 308 is a memory resident program that communicates with aq program 302 using the dynamic data exchange (DDE) link or mechanism 310 from graphical user interface 304. Another memory resident program, host_qry program 312, handles database queries to MIS host 124 through one of the communication links, such as communication link 116 of FIG. 4. Remote access is facilitated by remote access program 114, which may also be a memory resident "terminate and stay resident" (TSR) program. System architecture 100 of FIG. 4 is the host of remote access program 114 through modem 122, while a remote site machine also runs its own remote access program as indicated by block 314 and remote site modem 316. Remote access to the functions provided by aq program 302 using remote access programs 114 and 314 and modems 122 and 316 allow supervisors, agents, or other external persons or devices to access the functionality of the system.

Remote access program 114 is resident within system architecture 100 and is started by a self-executing, boot up, or initialization program or routine of operating system 318 as indicated by arrow 320, when processor 102 is booted. Remote access program 114 will wait on modem port 122 for any remote access. The channel_proc program 308 and host_qry program 312 are started when graphical user interface 304 is up and are terminated when graphical user interface 304 is not running as arrows 322 and 324 represent. The host_qry program 312 synchronizes the system clock with the MIS host 124 when started. It then waits for the DDE message 326 from aq program 302 for any database query task 328. The channel_proc program 308 checks all voice/data channels when started. It then waits for the startup DDE message 310 from aq program 302.

Once the application is initially started, the channel_proc program 308 accesses database 330 to establish monitoring sessions that may be scheduled for the day. Also, throughout its operation, channel_proc program 308 may receive direct requests or commands from aq program 302 to dynamically alter monitoring schedules or immediately direct channel_proc program 308 to monitor particular sessions. Therefore, channel_proc program 308 supports both static schedules contained in database 330 as well as dynamic schedules as modified in database 330 or commanded by aq program 302 based on a number of scheduling criteria. In one embodiment, aq program 302 may dynamically update schedules maintained in database 330, or alternatively, directly command channel_proc program 308 to initiate monitoring sessions.

In a particular embodiment, a random calculation algorithm establishes the recording of extensions scheduled to be monitored. The channel_proc program 308 also handles the supervisor's requests for play back session. Upon receiving a shutdown DDE message from aq program 302, the channel_proc program 308 will terminate all call processing activities on the voice/data channels. The channel_proc program 308 also performs channel diagnosis per request from aq program 302 and updates the status to aq program 302 through DDE message 310.

System data is centralized in resident database 330 where the aq program 302 retrieves and updates information pertaining to extensions, supervisors, monitoring periods, schedules, and monitoring sessions. The host_qry program 312 updates database 330 if the group, supervisor, or extension definitions have been updated or modified at the MIS host 124 after query 328. For example, host_qry program 312 may receive an updated workforce management schedule to provide static or dynamic scheduling in accordance with a variety of scheduling criteria, and provide this information to database 330.

In order to provide access to database 330, the system may implement one interface responsible for handling DDE messages and another interface responsible for managing database 330. This approach guarantees the data integrity and reduces the message resource requirements. All transaction-related DDE messages for database 330 may be handled through a single point of control, such as dde_server program 332. Database transactions may be handled separately by db_interface program 334. Both dde_server program 332 and db_interface program 334 are memory resident when interface 304 is operating.

When the channel_proc program 308 responds to a request of channel status through the aq program 302, the response may be one message per channel in order to simplify the message handling as well as to support the request of a single channel diagnosis. Also, a request for channel status may inquire into the voice/data channel, or other communication link supported among ACD 12, platform 16, and adjunct 33.

The following discussion describes in more detail the application software modules, which may incorporate multitasking capabilities of interface 304 to fulfill the requirements of being able to perform call processing tasks, user interface functions, and remote control operations concurrently. For example, the discussion that follows provides more detail concerning one embodiment of aq program 302.

The aq program 302 provides all interfaces to configuration option 208, administration option 210, scheduling option 212, reporting option 214, operations option 216, and maintenance option 218 in a menu-driven fashion. The aq program 302 communicates with db_interface program 334 using dde_server 332 whenever there is a need to access database 330. In a particular embodiment, aq program 302 will be a client to db_interface program 334 and related through the DDE link.

The host_qry program 312 uses one of the communication ports on processor 102 as the communication link with MIS host 124. This design makes the host database query 328 not so tightly coupled with processor 102, and supports a variety of switches manufactured by different vendors, as well as a variety of interface and protocol standards that may be employed in a computer telephony integration (CTI) environment.

It is important to synchronize the system clocks whenever there is more than one computer involved in an application. The system that provides the standard time clock should be MIS host 124. The host_qry program 312 carries out the task of the synchronization of the system clock according to host machine. Whenever interface 304 is started, which may be due to a machine reboot, the host_qry program 312 retrieves the current system clock from MIS host 124 and sets the system clock of processor 102 accordingly through a log-in to MIS host 124 and execution of a system time command.

To simplify the data query process, the host_qry program 312 performs the database verification query instead of downloading data from database 330 automatically. For example, if an agent extension is being defined, an extension is being scheduled for monitoring sessions, or a notification of a recording can be carried out based on whether the target agent is currently signed on, the presence of an agent verify DDE is verified by the host_qry program 312. The host_qry program 312, if the verify DDE is present, issues a database query to MIS host 124 to verify whether the extension has been defined. The result of the query is sent back to the client program from which the DDE was sent. The host_qry program 312 may also access MIS host 124 to receive other information, such as call setup information, traffic statistics of ACD 12, call types, and other CTI information conveyed from ACD 12 or adjunct 33 to platform 16.

Through an automated user request of aq program 302, a more complicated query may be executed to determine new agent information, call processing information, or any other information regarding operation of ACD 12 or adjunct 33 and maintained at MIS host 124 database. The host_qry program 312 submits SQL query statements to the MIS host 124 database through link 35 or 36 between processor 102 and MIS host 124. The return data will be checked against the resident database 330 and updated. The user may determine when it is necessary to query MIS host 124 for the latest agent data, supervisor data, and call processing information or, alternatively, this query may be performed automatically, periodically, or dynamically to inform aq program 302 of agent changes and incoming call information. This aspect of synchronizing operations between ACD 12, platform 16, and adjunct 33 allow static and dynamic scheduling of monitoring sessions based on a variety of scheduling criteria, including call type, traffic statistics, customer information, CTI information, and other information maintained at the call center.

In addition, from time to time changes to MIS host 124 database will occur that relate to the information contained within the system. Therefore, the user may periodically query MIS host 124 database to obtain those modifications. Other memory resident programs of the preferred embodiment include dde_server program 332, db_interface program 334, and channel_proc program 308. The dde_server program 332 is started by startup function in interface 304. The dde_server program 332 behaves as a server to other programs managed by interface 304 for accessing database 330. The dde_server program 332 communicates with db_interface program 334 for communicating data items with database 330.

In one embodiment, dde_server program 332 may be a single server that permits all DDE messages to be handled, which enhances the modularity of user interface and call processing programs. This consideration also enhances the portability of the application to different switching and computing environments.

The db_interface program 334 is also started by the startup function of interface 304. The db_interface program 334 handles requests from other programs regarding database 330 transactions. Thus, db_interface program 334 is a client as well as other programs (e.g., aq program 302 and host_qry program 312), while dde_server program 332 is the server with respect to their database accessing DDE links. A principal function that the system provides is to automatically record customer service representative sessions with customers according to the programmed monitoring session schedule. This may be performed through a single point of control so that the integrity of database 330 can be maintained, but also to make the call processing independent of the database package. The database package may be, for example, the MS SQL Server® when implemented in a network environment.

Another memory resident program is channel_proc program 308. The channel_proc program 308 is started by the startup function of interface 304. In a particular embodiment, voice/data processing in the channel_proc program 308 may be performed in asynchronous mode. A state machine approach is implemented in order to ensure that every voice/data channel may be fully controlled by channel_proc program 308. States within channel_proc program 308 are driven by events which occur in an asynchronous queuing mode of operation.

There are three major components of channel_proc program 308. They include the channel diagnosis component, a timer component, and a voice/data processing component. The channel_proc program 308 controls the voice/data channels through a voice/data driver function called to perform the recording and play back sessions described below. In a particular embodiment, dynamic link library interface is used to bridge the channel_proc program 308 with voice/data drivers 108.

Figure 8:
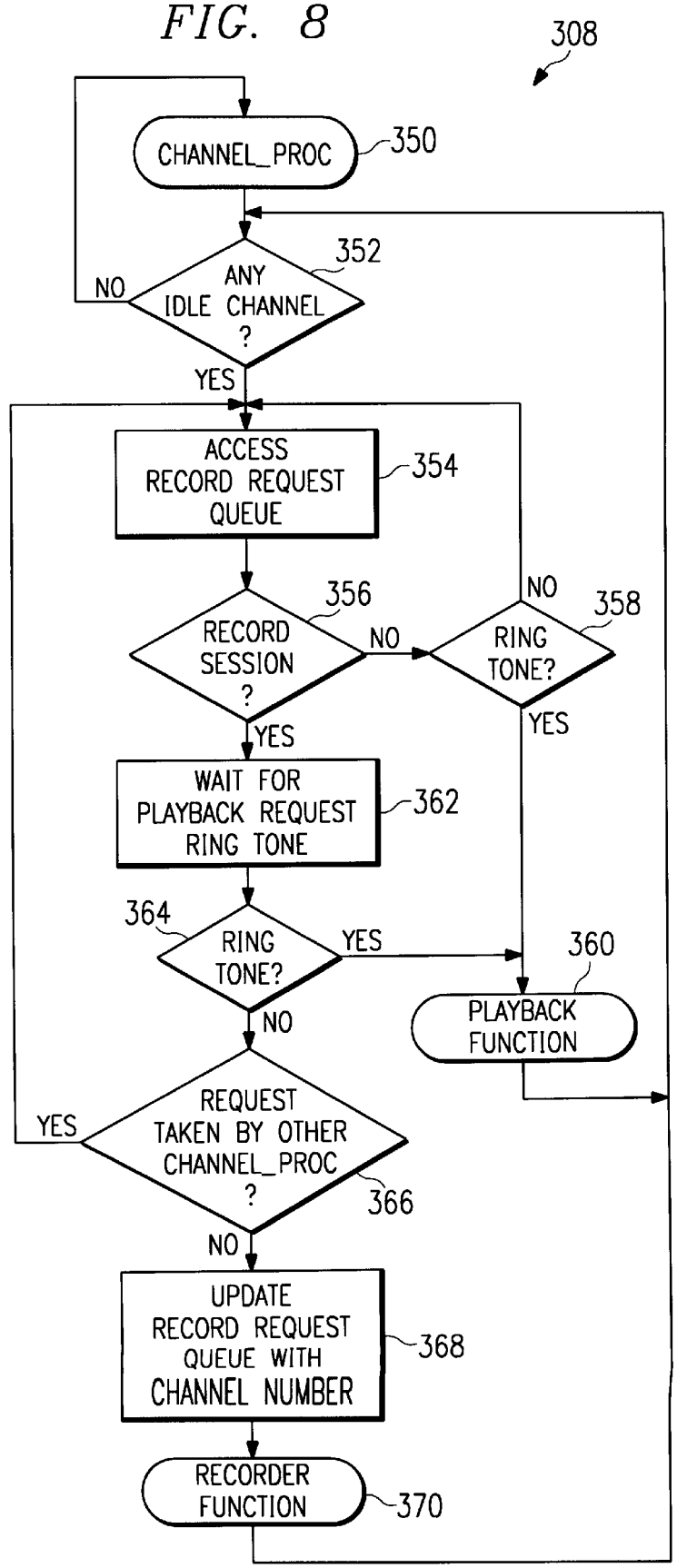
FIG. 8 is a process control flow diagram for the channel_proc program of the system.

FIG. 8 shows a process control flow diagram of channel_proc program 308. Generally, channel_proc program 308 manages the allocation of voice/data channels in the system in response to static or dynamic requests to record sessions. A static command to record a session may be maintained in a record request queue based on scheduling information maintained by database 330. A dynamic command to record a session may also be maintained in a record request queue or provided directly to channel_proc program 308 from aq program 306. The use of both static and dynamic commands to record a session allow the system to provide a number of scheduling criteria to determine when to record sessions. The channel_proc program 308 can manage voice/data channels independently or jointly depending on the configuration and interoperation between voice/data drivers 108, voice/data channels 110, and other selected hardware and software that supports voice and data communication among ACD 12, platform 16, and adjunct 33.

Beginning at channel_proc program access node 350, program control goes to query 352. At query 352, the presence of an idle channel is tested. If there is no idle channel then, process control goes back to node 350, and this is reported to node 350. This fact is then reported to aq program 302. On the other hand, if an idle channel exists, then flow goes to access record request queue at step 354. Flow proceeds to record session query 356 to test the condition of there being a command to record a session based on the contents of record request queue, or a dynamic command or instruction from aq program 302. If no such command exists, flow goes to query 358 to test the condition of there being an inbound ring tone or other indication on the voice/data channel representing a desire to monitor a session. If no indication exists, then control flow goes back to access record request queue 354. If an indication exists, then process flow goes to play back function block 360.

Referring to record session query 356, if there is a record session command in the queue or received from aq program 302, then process control flow goes to block 362 where the system determines if there is a play back request ring tone or other indication on the voice/data channel representing a play back request. From block 362, flow goes to query 364 to test for the existence of a ring tone or other indication. If there is a ring tone or other indication, then process control flow goes to play back function block 360. Otherwise, control flow goes to query 366 to examine whether the record request has been taken by another channel_proc task. If so, then control flow goes to block 354 to access the record request queue. If the request has not been taken by another channel_proc task, then control flow goes to block 368 to update the record request queue with the channel number to indicate that the identified voice/data channel is now associated with and ready to record a scheduled session. Next, control flow goes to block 370 to begin the recorder function. From either play back function 360 or recorder function 370, process control flow returns to query 352 so that the channel_proc program 308 continues to operate as described.

Figure 9:
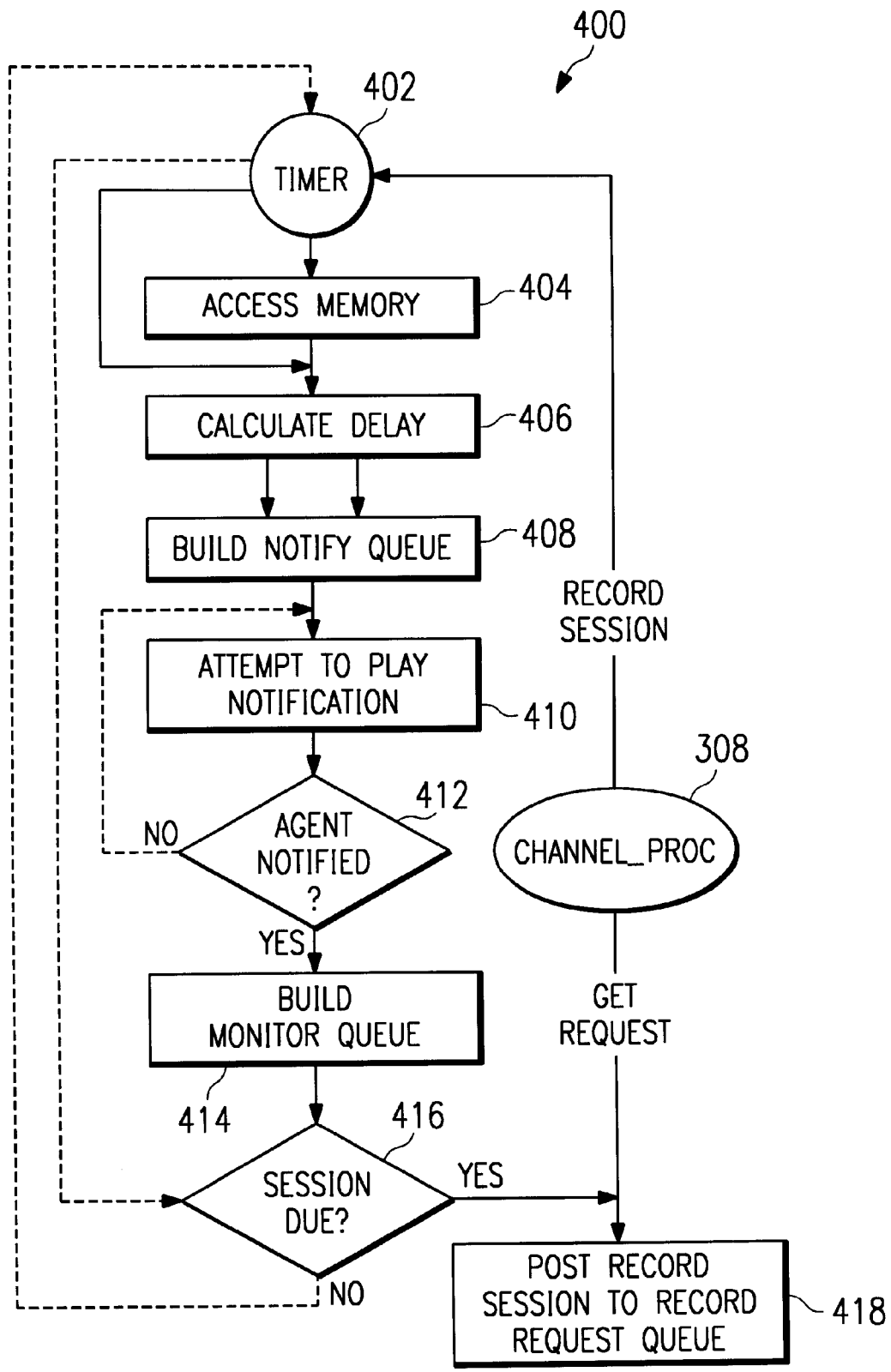
FIG. 9 is a process control flow diagram for the timer process of the system.

FIG. 9 shows process control flow diagram of the timer program 400 for establishing times for recording scheduled monitoring sessions. Timer program 400 also includes an optional "will be monitored" notification to agent extensions. Timer program 400 maintains a notify queue, a monitor queue, and a record request queue, which are described in more detail below. Notify queue, monitor queue, and record request queue may be maintained in database 330, within channel-proc program 308, timer program 400, or at another suitable memory location.

Referring to FIG. 9, the channel_proc program 308 accesses record request queue and, upon determining that a session should be recorded, accesses timer node 402. At timer node 402, timer program 400 both accesses memory as block 404 indicates and calculates a random, fixed, or other suitable delay period or interval to wait before beginning recording as block 406 represents. From block 406, process control flow goes to block 408 to build a notify queue, if this option is selected. From building the notify queue, process control flow goes to block 410 where an attempt may be made to play the notification to the agent to be monitored. Next, at query 412 the timer function queries whether the agent has been notified. If not, process control returns to block 410 where a further attempt is made to notify the agent. If the agent has been notified, as appropriate, process control flow goes to block 414 to build a monitor queue.

From block 414, process control flow goes to query 416 to examine whether a record session is due. If not, process control flow goes to timer node 402 and cycles until the time arrives for recording. If a record session is due, on the other hand, process control flow goes to block 418 to post the record session to the record request queue. The record request queue is a list of monitoring sessions waiting completion. The record request queue may represent sessions to be started and queued, current recording sessions to finish, or idle channels to become available. At the end of each record session, channel_proc program 308 retrieves information from record request queue for the next scheduled record session.

Relative to the build notify queue function 408 of FIG. 9, the notify queue is created if monitoring notification is selected by the system administrator. This ensures that an agent's extension is notified prior to actual recording taking place. Upon receiving a startup or day start from the aq program 302, timer program 400 (through channel_proc program 308) sends a db_load DDE to db_interface program 334 to acquire information about extensions, periods, and monitoring sessions for the rest of the day, to the extent that they are stored in database 330. This information may be dynamically or periodically updated using information concerning the operation of ACD 12 or adjunct 33. All extensions that are to be monitored for the day will be registered in the notify queue function associated with block 408.

For every extension on the queue, timer program 400 attempts to play the audio announcement to them prior to the beginning of the period of the first monitoring session. The notification takes place when the agent is signed on. In a particular embodiment, an attempt will be made every so often (as defined by a system parameter) to reach the agent until the notification is delivered or until the monitoring period for that extension has expired. Once the notification is delivered, the monitoring sessions scheduled for that extension for the rest of the monitoring period will be registered on the monitor queue associated with block 414 at which time the corresponding entry of the notify queue is removed.

If no notification is required, the monitor queue for all monitoring periods of all extensions scheduled for the rest of the day is constructed. In the monitor queue of timer program 400, there is a fixed or random calculation to determine when a monitoring session is to occur. A monitoring session may be started anywhere in the time frame from the time the entry is registered on the monitor queue until the end of the monitoring period or the termination of activity by the agent. Alternatively, the monitor queue may be populated dynamically using scheduling criteria such as call type, call traffic, agent performance, CTI information, and other scheduling criteria received from ACD 12 or adjunct 33. It is possible that a period is defined to bridge across the midnight boundary or may be defined to be coincident with the log-in and log-out times of the agent. The execution time of each session on the queue is determined based on the monitoring period in which the session is defined. Therefore, a session will be performed within the time scope of the period.

In one embodiment, the system can randomly distribute monitored sessions within their corresponding time period window. One exemplary calculation to yield a random distribution may be based on several factors. These factors may include, for example, the following:

(1) the number of extensions to be monitored;

(2) the maximum length of time of each monitoring session;

(3) the number and capacity of voice/data channels configured for monitoring;

(4) the duration of the monitoring periods;

(5) the time interval covered by each period;

(6) the results of the previous attempts to monitor scheduled sessions; and (7) a variety of scheduling criteria, such as scheduling rules, the number of calls, the call type, call center traffic, agent performance level, and other factors.

To determine the execution of a session, calculate delay function 406 determines a delay interval from the time the session is established to the time that it is executed. The calculation is based on the following formula:

$$\text{Delay} = (\text{a random number}) \bmod (TC-TE) \quad (1)$$

where TC is the total time that all channels can be used in the time range of the period, and TE is the total time of all required sessions in the time range of the period. The actual recording or execution time could be the current time plus delay time. Information such as which extension, when to monitor, how long the recording may be, and how many call segments the sessions may have are posted on the monitoring session node to the monitor queue associated with timer program 400. The sessions on the monitor queue are in chronological order, and immediate or dynamic recording requests may be placed at the top of the list. Therefore, the earliest session is the first node on the list, while the latest session is the last node on the list. Timer program 400 also puts a recording session on the record request queue whenever the execution of a monitoring session is due. Afterward, the corresponding entry in the monitor queue is removed.

When a supervisor defines the monitoring schedule for extensions or dynamic monitoring commands are received from aq program 306, the system performs a resource analysis to guarantee that the static and dynamic scheduled monitoring sessions are achievable. It is an internal function of the aq program 302 to carry out the resource analysis task.

For the resource analysis task, the following definitions are appropriate:

P: The time range of a monitoring period;

E: Total number of extensions needed to be monitored within P;

M: The maximum length of time that a monitored session is defined for the period;

C: Total number of channels designated for recording;

TC: Total time that all channels can be used in P;

TE: Total time of all required sessions in P.

Note that TC=C×P and TE=E×M. Consequently, TE can not be greater than TC. On the other hand, there could be time overlapping in two monitor periods. For example, if period 1 is defined, using 24-hour clock notation, as 0800 to 1130 and period 2 is defined as 0900 to 1230 such a situation could arise. That is, the time period from 0900 to 1130 is covered by both periods. The analysis must consider that resources are shared by sessions scheduled in both periods in the time interval between 0900 and 1130. An even more complex case may result if a third period, say, period 3 is defined as ranging from the log-in time of an agent (0800) and the expected log-out time of an agent (1300) which covers both period 1 and period 2. Therefore, periods 1 and 3 share the interval from 0800 to 0900; periods 1, 2 and 3 share the interval from 0900 to 1130; periods 2 and 3 share the interval from 1130 and 1230; and period 3 alone covers the interval from 1230 to 1300. The task, then, must divide the TC value by the interval shared by N, where N is the number of periods. Calculating the resources for the first period, the value of TC should be the following:

$$TC = (TC)((0800-0900) \div 2) + (TC)((0900-1130) \div 3)) = \quad (2)$$

$$((TC * (\text{integral shared by periods 1 and 3})) \div 2) +$$

$$((TC * (\text{integral shared by periods 1, 2 and 3})) \div 3))$$

Then the system compares the values of TE and TC. If the value of TE is close to the value of TC, for example eighty percent, chances are that the scheduled monitoring sessions will not all be accomplished. This percentage value can be one of the system parameters, since the channels can be used for recording as well as play back in a given period and the time occupied by play back sessions can be an important factor that determines the acceptable relative values of TE and TC. Users will be warned of the possibility of not being able to accomplish the scheduled sessions if the TE value is not acceptable. Another resource analysis determines the available storage space for the recorded sessions. This is described in connection with the discussion of the recorder function of FIG. 10. These types of preventative actions minimize problems due to lack of resources while actual sessions progress.

As an alternative to the resource analysis approach discussed above, the system can over schedule sessions. In this embodiment, platform 16 monitors as many scheduled sessions as the system capacity allows and continuously tracks the progress towards meeting the established scheduling criteria of the agent schedules. This capacity-limited monitoring allows platform 16 to meet the scheduling criteria by monitoring as many sessions as possible. Often, the exact time for monitoring particular scheduled sessions is difficult if not impossible to ascertain due to the call traffic and agent dynamics in a call center environment. With over scheduling, platform 16 monitors sessions when possible to satisfy agent schedules.

In an over scheduling example, Monday agent schedules exceed the capacity of the system. On Monday, platform 16 monitors sessions when possible and tracks the progress towards meeting the agent schedules. On Tuesday, platform 16 establishes the Tuesday schedule based on the unfulfilled Monday schedule, and continues to monitor sessions accordingly. Similarly on Wednesday, platform 16 establishes the Wednesday schedule based on the unfulfilled Tuesday schedule, and continues to monitor sessions accordingly. This continues through the week until platform 16 satisfies the agent schedules. In this manner, a supervisor may establish a single agent schedule for the week that begins on Monday and continues through the week until complete. This same concept of over scheduling and spill over may be performed over a day, week, month, or other time period. Platform 16 may combine over scheduling with fixed schedules, a resource analysis approach, and other scheduling techniques. Also, platform 16 may assign suitable monitoring priorities that determine the order in which agent schedules should be satisfied.

An important aspect of the preferred embodiment is the voice/data processing function. This function contains the recording function and play back functions described in FIGS. 10 and 11 below, respectively. The recording and play back functions perform call processing functions using the voice/data channels 110 and voice/data drivers 108 of FIG. 4.

Figure 10:
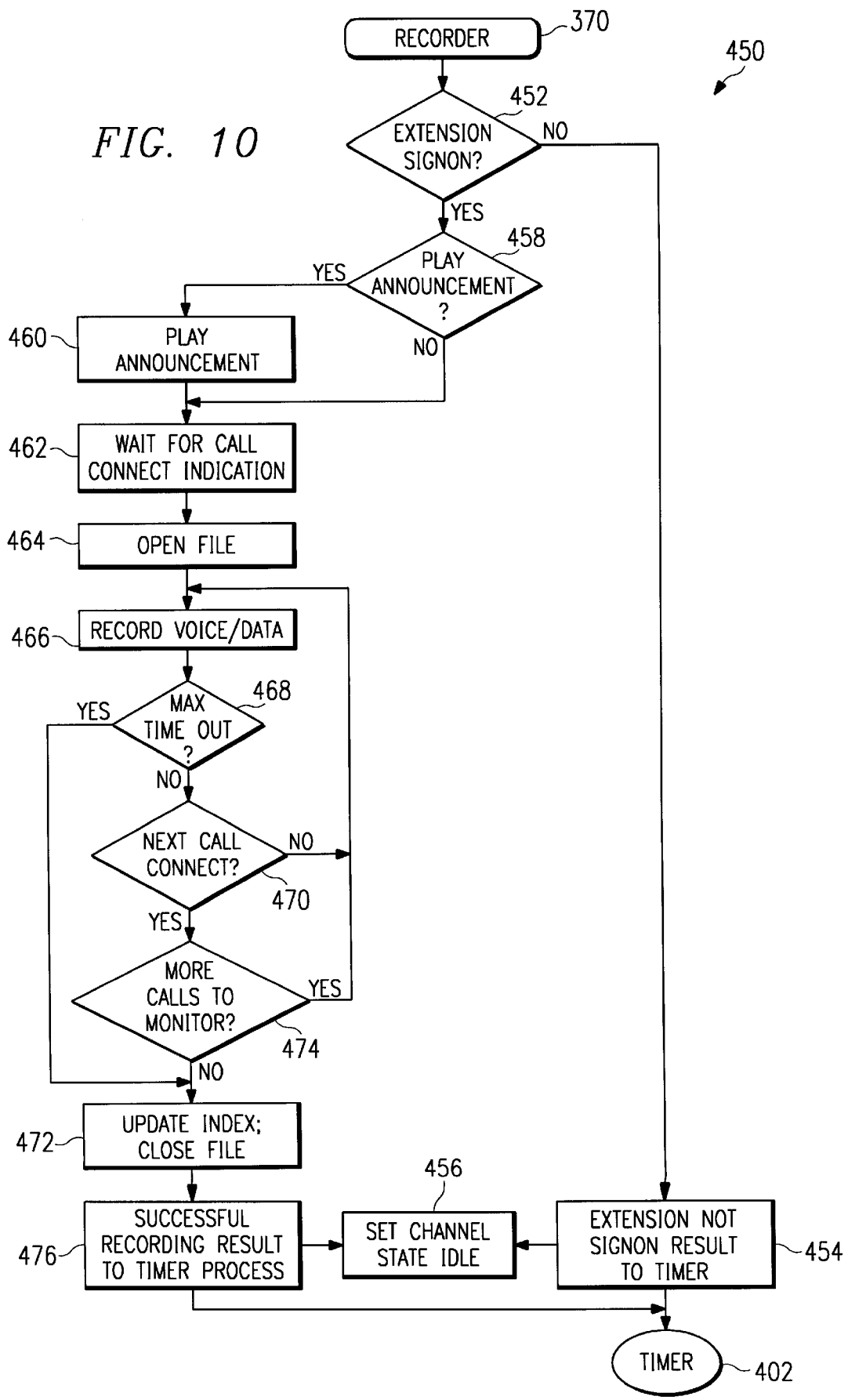
FIG. 10 is a function control flow diagram for the recording function of the system.

FIG. 10 shows a function control flow diagram 450 for recorder function 370. Generally, recorder function 370 provides the agent announcement, records the session, manages the creation and modification of voice/data files, and manages channel resources to record the scheduled sessions. In a "logger" environment, many of the functions illustrated in FIG. 10 may be unnecessary from a recording standpoint, since a logger typically records all voice/data transactions occurring in a call center environment. However, in a "logger" environment, recorder function 370 may embed play back information, call information, or scheduling criteria, or otherwise identify certain portions of the logged sessions for later selective play back, as described above. It should be understood that the teachings of recorder function 370 are applicable to both selective recording and selective play back of logged sessions.

Beginning at recording function block 370, the system of the preferred embodiment accesses the channel_proc program 308 as described in FIG. 8. Function control flow goes to query 452 to determine whether an extension is signed on (e.g., has the agent logged into agent workstation 14?). If the extension is not signed on, then function control goes to block 454 to generate a message that indicates the result that the extension is not signed on. This result goes to timer function node 402 and to block 456 to set the channel state to idle. On the other hand, if the extension is signed on, then at query 458 a test is made to determine whether an announcement is to be played that notifies the agent of the impending recording session. If so, then function control flow passes to block 460 where an announcement is played to the agent's extension. If not, then function control flow goes to block 462 at which point the system waits for a call connect indication, which may use in-band or out-of-band signaling.

Once a call connection occurs, the system opens a voice/data file at block 464 and begins recording at block 466. Blocks 464 and 466 contemplate opening one or more voice/data files to capture both voice and data transactions during the session. For example, voice signals may be digitized and stored in a voice file, whereas data such as a screen shot or customer information may be stored in a separate data file associated with the corresponding voice file. Also, block 466 may include header information and trailer information that identifies the session, session scheduling criteria, beginning time, length, and other information regarding the characteristics of the recording session and the operation of ACD 12 and adjunct 33.

Recording continues while query 468 verifies that a maximum time limit or recording length has not been reached and query 470 determines if the next call has been connected to the agent. If the maximum time limit or recording length has been reached, then query 468 directs function control flow to block 472 where the steps of updating the index and closing the voice/data file take place. Additionally, at query 470 when the next call is connected to the agent, function control flow then goes to query 474 to determine whether there are more calls to monitor. The logic flow of blocks 466–474 in FIG. 10 implement exemplary scheduling rules that allow the user to specify the number of calls to record, the maximum recording length, or both the number of calls and the maximum recording length. Other scheduling criteria and scheduling rules may be implemented in a similar fashion without departing from the spirit and scope of the present invention, as described in more detail with reference to FIGS. 12 and 13 below.

If there are more calls to monitor, then function control flow returns to record step 466. On the other hand, if there are no more calls to monitor, function control flow proceeds from query 474 to block 472 at which point the index is updated and the voice/data file is closed. From block 472, function control flow goes to block 476 to generate a successful recording result message to timer function node 402 and to set the channel state to idle at block 456. This completes a general description of the operation of recorder function control flow diagram 450.

As described, the recorder function performs the recording of a monitoring session. When a recording session starts, one or more voice/data file with a distinct name will be opened. Each voice/data file may contain a leading section reserved as a file header that includes data regarding the contents of the rest of the file. One purpose of the file header is to register when there is more than one segment of voice/data in the file. These segments may have different characteristics such as annotation from a supervisor added after a play back session. Therefore, a voice/data file may contain a sequence of blocks that the file header defines.

During a play back session, a supervisor may annotate comments with respect to any part of the recorded session from time to time and be able to monitor the session with the annotations appearing after each segment. These annotations may be played back when the file is played again. In the preferred embodiment, the voice/data processing function provides a silence compression mode to eliminate silence intervals during recording as well as a data compression mode to reduce or eliminate storage of redundant data. The monitoring length defined in the period is a wall clock time. A voice/data file may actually contain only a fraction of the expected time length due to silence and data compression, even if the recording session takes up to the maximum specified time length. This can be considered as a bonus for disk resource, as well as the amount of supervisor time needed to perform the monitoring reviews, but may not be considered as a factor in the resource analysis.

The following considerations are important when determining the necessary resources to accommodate the recording files. As can be seen below, the requirements for storing voice information are relatively easy to predict based on the length of the recording, the fidelity of the voice representation, and any associated compression techniques. However, there may be wide variations in the amount of storage media required to record data files. For example, data input by the agent or received as call status information or customer information may not require significant storage, whereas full graphical screen shots and other high resolution images may require significant storage. Obviously, the various capacity requirements for voice/data files depends on the particular implementation and functions in the call center environment.

Voice information may be recorded at a rate of 24,000 bits per second, so the maximum length of uncompressed voice information will be (24,000÷8)×(the time in seconds that is specified in the monitoring period). The 24,000 bits per second comes from the 4-bit adaptive differential pulse code modulation (ADPCM) encoding and a 6,000 Hz sampling rate. The following calculation may give an idea about how many minutes of voice information may be digitized with a 1 MB disk storage capacity:

$$(1024 \text{ bits} \times 1024 \text{ bits}) \div \qquad (3)$$
$$((24,000 \text{ bits}/\text{second} \div 8 \text{ bits}) \times 60 \text{ seconds}/\text{minute}) =$$
$$5.8 \text{ minutes}$$

With a 1.2 gigabyte SCSI disk drive, the capacity of storing voice information is about 100 hours.

Digitized voice/data files may take significant amounts of disk space. In order to accommodate all required monitoring sessions and adding annotations, disk space management is an important aspect of the preferred embodiment. Available disk space may be checked at the beginning of a day, whenever the monitoring schedule of the day is revised, when a monitoring session is about to start, when a play back session is requested, when an annotation starts, and when a user is recording or re-recording the voice/data files used for play back prompts.

Assuming the voice storage statistics from above and only incremental increases for screen shots and other data capture, the minimum disk space required is calculated by (3,000)×(the monitoring time in seconds) of all unfinished sessions for all extensions that may be monitored during the day, plus the space reserved by a system parameter of how many minutes of annotation for a day is allowed and all utility voice/data files used in the prompts during the play back sessions. There must be a system reserved disk space buffer so that, if the remaining disk space falls below this limit, all subsequent voice/data file generations will not take place until sufficient disk space is available, that is, after some voice/data files are deleted through the voice/data file maintenance function of the aq program 302.

Optionally, the actual recording does not start until a specific tone or other appropriate in-band or out-of-band signaling (e.g., signaling indicating that a call has just been connected to the monitored extension) arrives from ACD 12 or a pre-defined period of silence occurs within the recording session. In this operational mode, every call recorded will be a complete call. If more than one call is scheduled to be monitored in a session, the recording will continue until the next call connect indication or silence interval and after the last call is recorded or the maximum time length is reached. In a particular embodiment, a call will not be truncated even if the maximum time length has been reached.

Figure 11:
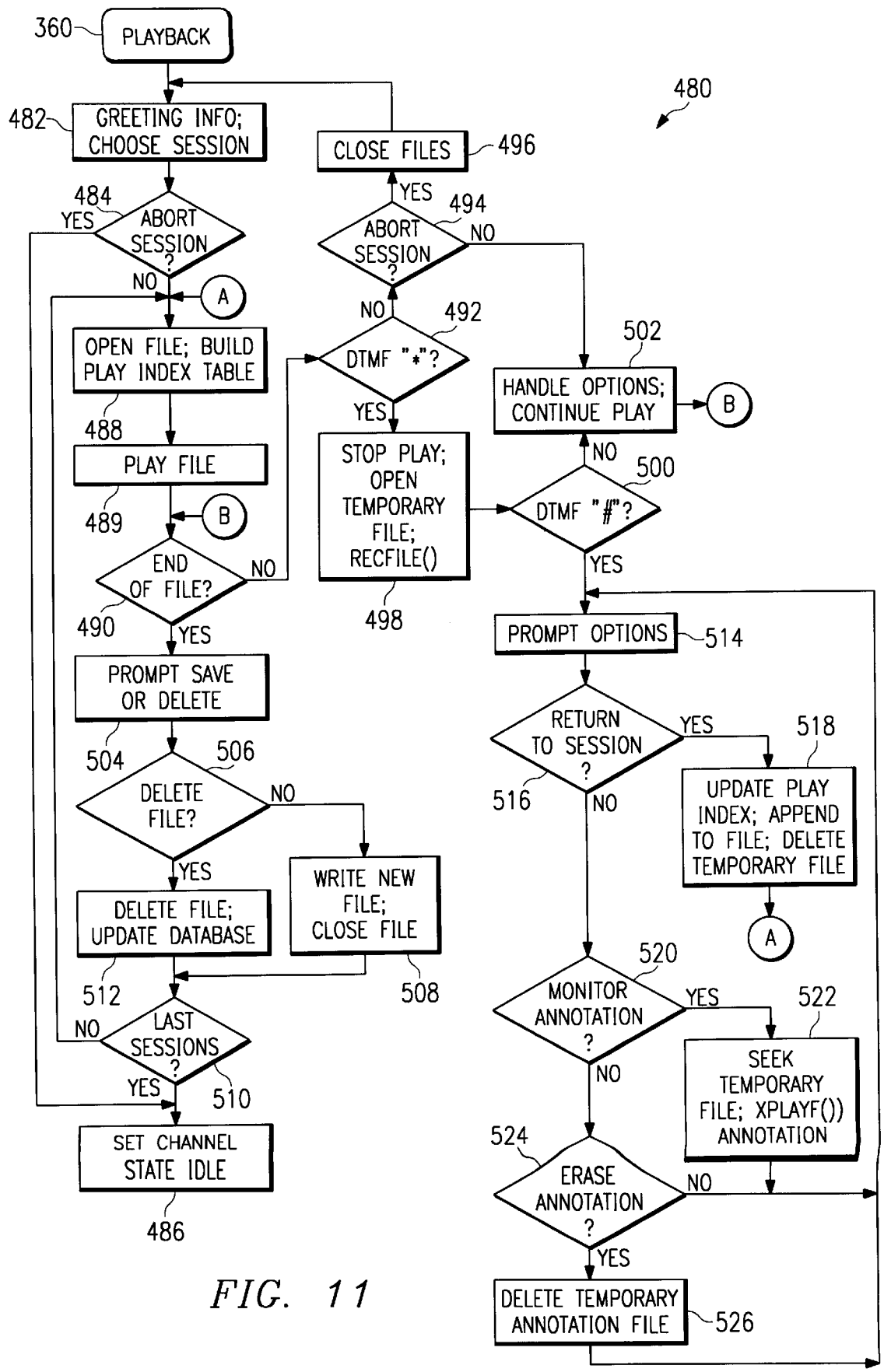
FIG. 11 is a function control flow diagram for the play back function of the system.

After recording the monitoring sessions, there is the need to play them back in a variety of different modes. For this purpose, FIG. 11 shows the function control flow diagram 480 for the play back function. Beginning at block 360, play back can be accessed through the channel_proc program 308. From block 360, function control proceeds to block 482 where greeting information is given and session parameters presented to the user. Then, function control goes to query 484 to determine whether an abort session command exists.

If an abort session command exists, then function control goes to block 486 where the channel state is set to "idle". If there is no abort session command, function control goes to block 488 at which step a voice/data file is opened, a play index table is built, and recorded sessions begin to be played back to the user at step 489. In a particular embodiment, a supervisor may monitor the voice component of the play back session using voice instrument 32 and the data component of the play back session using supervisor workstation 30. A particular advantage offered by the present invention is the use of a remote voice instrument or computer to perform the play back function using remote access software and hardware.

From block 489, function control goes to query 490 to test whether the control flow is at the end of the voice/data file. If not, then, function control flow goes to query 492 to test whether the dual tone multifrequency (DTMF) signal that corresponds to the telephone keypad digit "*" has been received. Alternatively, the user can input commands during monitoring of play back sessions using the keyboard or other input device associated with supervisor workstation 30. In the particular embodiment using DTMF signaling, the "*" is used to signal the user's desire to pause and record or input a voice/data annotation. If there is no DTMF "*" signal, function control proceeds to query 494 where the abort session test occurs. If an abort session signal is present, then function control flow goes to block 496 to close the voice/data and index files and return to block 482 where the greeting information and session options are presented to the operator. If at DTMF "*" query 492 the DTMF "*" input is present, function control goes to block 498 where play is stopped and a temporary voice/data file is opened for the purpose of recording a voice/data annotation. Annotation recording at block 498 contemplates voice recording, electronic mail generation, or generation of voice/data annotations that can be visually or audibly presented to the agent or other supervisor. Annotation recording will continue until at query 500 the presence of a DTMF signal is detected. If the DTMF signal is not a "#," then function control proceeds to block 502 where options are handled and play continues. This is the same step that abort session query 494 directs flow control to in the event there is not an abort session signal in the queue.

Returning to query 490 of whether the end of the file exists, if an end-of-file signal is present, function control goes to block 504 at which point the user is prompted for a response of whether the user desires to save or delete the voice/data file. Function control then proceeds to query 506 at which a test occurs of whether a delete voice/data file command is present. If there is no delete voice/data file command, then function control proceeds to block 508 where the existing voice/data file is closed. Function control proceeds to query 510 to test whether the user is monitoring the last set of sessions. On the other hand, if at query 506 a delete voice/data file command is present, then function control goes to block 512 where the voice/data file is deleted and the database is updated to reflect this deletion. Then, function control proceeds to query 510 to examine whether the user is monitoring the last session. From query 510, if the operator is monitoring the last session, then function control flows to set channel state idle block 486. On the other hand, if this is not the last session, then function control flows to block 488.

Returning to query 500 of whether the DTMF "#" input is present, an affirmative test directs function control to block 514 where the user is prompted to various options that the user may exercise. Then, function control proceeds to query 516 at which point a test is made of whether there exists a return-to-session command in the system queue. If there is a return-to-session command, then function control proceeds to block 518 at which point the play index is updated, the annotation is inserted into the voice/data file, and the temporary file that was opened at block 498 is deleted. Then, function control proceeds back to block 488 where further play back can proceed. If there is not a return-to-session command upon query 516 testing for the existence of such, then function control proceeds to query 520 to determine whether there is a monitor annotation in the queue.

If there is a monitor annotation, then function control proceeds to block 522 to seek another temporary file and play an annotation. Then, function control returns to block 514 to provide to the user the various appropriate prompt options. At query 520 if no monitor annotation exists, then function control proceeds to query 524 to test whether there is an erase annotation. If there is no erase annotation, then function control returns to prompt options block 514. On the other hand, if there is an erase annotation, then function control goes to block 526 for the purpose of deleting the temporary annotation file. Then, function control returns to prompt options 514.

Having described the play back function through function control flow chart 480, more detail of the various functions that occur in play back function are provided herein. For example, the following auditory or displayed prompts apply to all sessions, or sessions in a subgroup, or sessions of an extension.

"There are XX sessions that have not previously been played."

"These sessions total YY minutes."

"Press 1 to specify a specific session."

"Press 2 to begin playing these sessions in time sequence order."

This is not limited by any not previously played sessions. If a "1" is entered, the system asks for the session identification number using the following command:

"Enter the session ID desired."

The session identifier or ID is the digits part of the voice/data filename of the session. The supervisor can obtain information about all monitored sessions from the session report via either the screen or a printout, or both. Prior to each play back session, information about the session is presented to the reviewer in the following way:

"The following session recorded at MMDDHHMM for John Smith (name) at extension ZZZZ is YY minutes long."

The message may also indicate that the voice component of the session is accompanied by screen shots or other data associated with the session and suitable for display on supervisor workstation 30. During a play back session, the following Table 1 lists DTMF digits that may be entered for various actions:

TABLE 1

| DTMF Digit | Action |
| --- | --- |
| "0" | Abort Session; |
| "1" | Increase the play speed; |
| "2" | Skip ten seconds; |
| "3" | Increase the play volume; |
| "5" | Pause and resume toggles; |
| "7" | Decrease the play speed; |
| "8" | Back-up ten seconds; |
| "9" | Decrease the play volume; |
| "*" | Pause and record an annotation; |
| "#" | Stop the annotation |

After the "#" is entered during an annotation session, the system of the preferred embodiment prompts the supervisor in the following way:

"To return to the session, press 4."

"To monitor to the annotation just recorded, press 5."

"To erase the annotation just recorded, press 6."

At the end of each session played, the supervisor may delete or save the played session as block 504 indicates. Therefore, the preferred embodiment plays to the supervisor or other user the following prompt:

"To delete this session, enter 88."

"To save this session, enter 11."

Upon entering a play back session through block 482 of FIG. 11, the voice/data file of the session is opened at block 488 and the play back information is constructed from the header of the voice/data file.

One user input is the DTMF "*" that pauses the play back and records the voice/data annotation from the user. When the DTMF "*" is entered, to record an annotation is similar to the recording process in the recorder process that FIG. 10 describes. However, in the annotation mode a temporary file describing the process includes an annotation voice/data filename. Once the annotation is recorded, the associated file header is updated. The annotation voice/data file is concatenated to the original voice/data file when the play back session resumes if the annotation has not been selected for erasure. Information about blocks are updated in the file header when the voice/data file is written to disk.

Figures 12, 13:
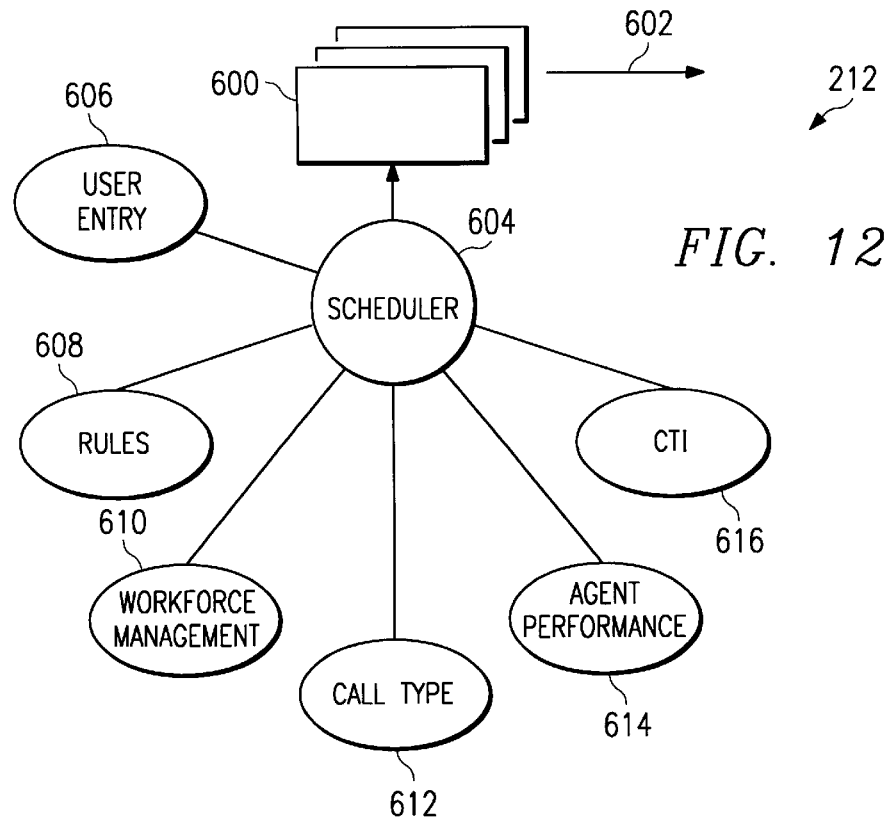
FIG. 12 illustrates components of the scheduling functions of the system.
FIG. 13 illustrates an exemplary screen for establishing monitoring schedules using a variety of scheduling criteria.

FIG. 12 illustrates in more detail the sources and character of various scheduling criteria that may be used to implement scheduling option 212 in a selective recording or logger embodiment. Schedules may either be static or dynamic and may be based on a variety of scheduling criteria supplied by a user or other components in the system, such as ACD 12 and adjunct 33. Generated schedules 600 are provided to other components of the system as indicated by arrow 602 to perform the recording and monitoring functions. In a logger embodiment, the information illustrated in FIG. 12 comprises play back information.

Scheduler 604 receives scheduling criteria from a variety of sources to generate schedule 600. During its operation, scheduler 604 may create static schedules, update the static schedules, or provide dynamic scheduling information depending on the operation of ACD 12, platform 16, and adjunct 33. Scheduler 604 may receive user entry 606, similar to the information illustrated in FIG. 2 above, from supervisor input at workstation 30. This information may include monitoring intervals, monitoring rules, specifications of the number of calls (maximum or minimum), monitoring length (maximum or minimum), and other criteria. Scheduler 604 then generates static schedule 600 in response to user entry 606.

Scheduler 604 may also implement particular scheduling rules 608 to implement the desired schedule received as user entry 606. For example, rule 608 may include logical algorithms that determine the time, length, and character of monitoring sessions. Simple scheduling rules may provide simple logic flow (such as the logic flow illustrated in blocks 466–472 of FIG. 10) based on the specified number of calls and minimum or maximum monitoring length. These scheduling rules are also described below with reference to FIG. 13.

Scheduler 604 may also receive other information that allows modification of existing schedules 600 or dynamic creation of new schedules 600. A workforce management block 610 may receive agent and supervisor attendance and scheduling information to more effectively adjust monitoring sessions to accommodate the individual schedules of the supervisor and monitored agents. Scheduler 604 may receive this information from ACD 12, adjunct 33, or MIS host 124. For example, workforce management block 610 represents agent and supervisor attendance information, scheduling information, log-in and log-out times, and other information that allows continuous monitoring of the available agents and supervisors within the cost center.

Scheduler 604 may also receive other information relating to the operation of ACD 12, platform 16, and adjunct 33 that comprise additional scheduling criteria to establish schedule 600. For example, scheduler 604 may receive call type information 612 that comprises call setup information, automatic number identification (ANI) information, active extensions, customer information either provided as in-band or out-of-band signaling or retrieved from a database accessible by adjunct 33 or other components, and other information identifying the type of call, the customer, or other information regarding the call received at the call center. For example, particular calls may be received at the call center that include an ANI that identifies a particular customer. It may be desirable for scheduler 604 to establish monitoring sessions for particular agents in the handling of particular types of calls. Also, call type information 612 may indicate a particular voice/data transaction represented by the call that a supervisor may want to monitor. For example, the call center may handle certain financial transactions for a mutual fund company, and it may be desirable for the supervisor to monitor selected calls that relate to particularly complicated financial transactions to assess agent performance. The present invention contemplates any number and combination of call type information 612 to establish schedules for monitoring agent performance.

Scheduler 604 may also receive agent performance or scoring information from agent performance block 614 that can be used to schedule monitoring sessions. For example, if an agent's performance measure falls below a certain level, the supervisor may desire to monitor additional sessions to take corrective action. Similarly, if an agent's performance measures consistently high, there may be a desire to record sessions of that agent as an exemplar in handling customer calls. Both call type information 612 and agent performance information 614 may be dynamically provided to scheduler 604 to modify or create additional schedules 600 and establish monitoring sessions.

Scheduler 604 may also receive other information regarding the operation of ACD 12, referred to generally as computer telephony integration (CTI) information 616. CTI information may include traffic statistics; voice/data channel assignments, statistics, and diagnostics; and any other information maintained or generated by ACD 12 or adjunct 33 that relates to the operation of the call center. For example, call traffic statistics provided by CTI information 616 may indicate peak periods in which supervisor desires to monitor agent performance under pressure. Similarly, CTI information 616 may include data from a customer database that provides instructions on handling particular calls. For example, CTI information 616 may include a directive for a particular type of call or customer that specifies a certain handling of the call, and the supervisor may desire to schedule these special calls to assure that the directives are properly considered by the agent in servicing the call. As with call type information 612 and agent performance information 614, CTI information 616 may be dynamically provided to scheduler 604 to immediately direct the system to monitor sessions that are about to begin or are in progress.

FIG. 13 illustrates a variety of scheduling criteria to establish monitoring periods 700 which in turn defines agent schedules 750. These scheduling criteria are applicable in both a selective recording and logger embodiment. Each monitoring period 700 may be defined by one or more scheduling criteria, such as an interval 702, an applicable scheduling rule 704, a specified number of calls (maximum or minimum) to monitor 706, and a monitoring length (maximum or minimum) to monitor calls 708. Scheduling criteria may also include a random indicator 710 that specifies whether monitored calls are to be randomly distributed over interval 702. Additionally scheduling criteria may include a call type 712, an agent performance level 714, and CTI information, such as call traffic statistics 716. It should be understood that the scheduling criteria listed in FIG. 13 is exemplary, and that the system contemplates additional scheduling criteria to define monitoring periods 700.

Defined monitoring periods 700 may be either scheduled or dynamic. In a particular embodiment, scheduled periods 720 include a time interval 702 to specify the particular time in which the monitored session should occur. Dynamic periods 722 may not specify a particular time interval 702 in which the monitored session should occur. Instead, dynamic periods 722 may be triggered to dynamically begin a session based on the detection of information such as call type 712, agent performance level 714, and call traffic 716. A monitoring period may also be a combination of a scheduled period 720 and a dynamic period 722 in that it specifies a particular time interval 702 that includes triggers for dynamic scheduling criteria.

The following is a description of some of the defined monitoring periods 700 in FIG. 13, but the present invention contemplates other possible monitoring periods 700 using different combinations of scheduling criteria. Period one specifies a monitoring interval from 0800 to 1200 that invokes scheduling rule one and specifies five calls to be monitored. Furthermore, period one specifies that these calls should be randomly distributed through the interval, that the call should be of a particular type, and that the scheduling should only occur when the performance level of the agent falls below a score of eighty.

Similarly, scheduling period two defines an interval for call monitoring between 0833 and 1233, which may be the result of platform 16 detecting the log-in of an agent at 0833, and automatically setting interval 702 to span four hours. This monitoring period invokes scheduling rule two which sets a maximum monitoring length of thirty minutes. Also, the monitoring period includes a random distribution, and records when the performance level of the agent is above a score of fifty and the call traffic measures level one.

Period three defines a monitoring interval between 1200 and 1700 that invokes scheduling rule three and specifies five calls, a maximum monitoring length of thirty minutes, and a random distribution. In this embodiment, the system will monitor five calls as long as their total monitoring time does not exceed thirty minutes. If the monitoring time does exceed thirty minutes during one of the calls, the system can either terminate monitoring immediately or terminate monitoring after completion of the current call.

Period four implements scheduling rule four between 0800 and 1200 and specifies five calls, a minimum monitoring length of thirty minutes, and no random distribution. In this particular embodiment, the system will monitor at least five calls, and additional calls if necessary to reach a minimum monitoring length of thirty minutes.

Dynamic periods 722 include monitoring period five that does not specify an interval, but implements scheduling rule one for ten calls with a call type of two and a call traffic level of two. Similarly, period six implements scheduling rule two to monitor at least twenty minutes of calls when the agent performance level drops below a score of eighty. Monitoring period seven implements scheduling rule three with five calls and up to thirty minutes specified for call type three with a call traffic of level one. Finally, scheduling period eight specifies monitoring of all calls with call type four.

Agent schedules 750 include agent names or identifiers 752 and days of the week 754. One or more monitoring periods 700 can be identified for each agent 752 on each day of the week 754. For example, Tom will be monitored based on monitoring period one on Monday, Tuesday and Wednesday. Similarly, Jill will be monitored on Wednesday and Thursday using monitoring period eight. Also, an agent for a given day may include multiple monitoring periods, as indicated by Mary's schedule which includes multiple monitoring periods for Monday, Thursday, and Sunday. Also, if Mary's performance level drops below a score of eighty on any day, the system will record at least twenty minutes of calls serviced by Mary in accordance with monitoring period six.

Also, agent schedules 750 in an over scheduling environment may include many monitoring periods 700 on Monday. For example, each agent may have more than one monitoring period 700 for Monday alone and, based on the capacity of the system, platform 16 cannot monitor all sessions on Monday. On Tuesday, platform 16 operates on the unfulfilled monitoring periods 700 from the Monday schedule, plus additional monitoring periods 700, if any, for Tuesday. On Wednesday, platform 16 operates on the unfulfilled monitoring periods 700 from the Monday and Tuesday schedules, plus additional monitoring periods 700, if any, for Wednesday. This over scheduling and spill over technique continues through the week.

The scheduling and monitoring system described above may also be implemented using a "logger" technique. In this embodiment, a portion or all of the voice/data sessions at the call center are logged or recorded onto a high capacity storage device, such as memory 104 and/or backup 120, to generate logged sessions. This recording may be performed irrespective of scheduling criteria or monitoring periods. The system then selects portions of the logged sessions to play back using the variety of scheduling criteria discussed with reference to FIGS. 12 and 13. Instead of activating and deactivating a recording device, platform 16 may schedule monitoring sessions by placing pointers or other information into the logged sessions, or by creating a separate file that indicates those selected portions of the logged sessions to be monitored to assess the performance of the call center agent. Scheduling to monitor the performance of call center service representatives may be done before, during, or after the handling of customer calls.

Platform 16 may select portions of the logged sessions as the recording is being made by inserting play back information into the logged sessions based on scheduling criteria. This play back information includes tags, markers, flags, or other play back indicators that specify portions of the logged sessions intended for play back. Play back information may also include call information on the time of day, call, agent, or other information that can be used while logging the sessions or at a later time to determine whether various scheduling criteria are met. For example, logged sessions may include the voice/data associated with the call, as well as information on the number, time, and length of calls, the session identifier, the agent identifier and extension, call type information, call center traffic statistics, agent performance statistics, or any other information that allows retrieval of selected sessions from the logged sessions based on a variety of scheduling criteria. Play back information may be placed in file headers or trailers of the voice/data file, or maintained in a separate file associated with the voice/data file.

Portions of the logged sessions may be selected after recording based on similar information inserted in or associated with the logged sessions. For example, platform 16 can generate logged sessions with associated play back information without consulting particular scheduling criteria or monitoring periods. Then, after logging, platform 16 can process the logged sessions to extract selected portions for monitoring based on whether associated play back information meets certain scheduling criteria. In this embodiment, a user or supervisor can specify scheduling criteria before or after generation of logged sessions. This batch operation to select portions of logged sessions for play back may be performed at off-peak hours of operation to minimize the demands on ACD 12, platform 16, and other components of the call center. Generally, platform 16 selects portions of logged sessions to play back for agent monitoring during or after recording, and using any suitable combination of play back information, call information, and scheduling criteria.

This logger embodiment simplifies the actual recording of sessions and maintains a complete history of the sessions handled by the call center, but does require increased storage capacity. However, advances in the capacity and performance of storage media may provide the added flexibility and integrity of a system that generates logged sessions for selective play back. Therefore, the present invention contemplates an analogous "logger" approach to accomplish all of the monitoring and scheduling features.

In a particular embodiment, platform 16 maintains information in memory 104 and/or backup 120 as a session memory, schedule memory, and play back memory. Each session stored in session memory represents a call handled by a service representative and includes a session identifier that distinctly identifies the session and voice/data associated with the session. Session identifier may then be associated with play back information maintained in play back memory. Platform 16 selects sessions stored in session memory using scheduling criteria stored in schedule memory and play back information stored in play back memory, and provides the appropriate session identifiers for retrieving voice/data associated with selected sessions from session memory. This arrangement of session memory, schedule memory, and play back memory applies to both selective recording and logger embodiments.

Schedule memory maintains monitoring periods, scheduling criteria, and other information described above with respect to FIGS. 12 and 13. Play back memory includes information associated with sessions maintained in session memory. This information includes session identifier and other play back information associated with the session that allows selection of sessions based on a variety of scheduling criteria. For example, play back information for the first session may include a date (03/01/97), a time (0837), an agent name or identifier (Tom), an extension (039), a call type (01), a length of the call in seconds (120), a current indication of call center traffic (02), a performance measure of the identified agent (73), or any other suitable play back information. Play back memory illustrates similar play back information for other sessions in session memory. A play back indicator may be placed in session memory, play back memory, or both. Play back indicator represents a decision to select the associated session for play back or monitoring.

Session memory, schedule memory, and play back memory may be maintained in one or more temporary or permanent memory locations, files, or arrangements of information in memory 104 and/or backup 120. Each of the memories represent separate files or arrangement of information maintained for different agents, days, extensions, or other criteria.

In summary, the present invention provides a method and system for monitoring the performance of a service representative such as a call center agent servicing voice/data transactions. The method and system permits monitoring periods within which to monitor the performance of service representatives in responding to received calls based on a variety of scheduling criteria, such as the number of calls (maximum or minimum), the monitoring length (maximum or minimum), scheduling rules, call type, agent performance, call traffic, or other information. In a particular embodiment, the invention automatically and randomly determines the time for monitoring and records the proper calls for the proper length of time as specified by the various scheduling criteria. The call center supervisor may subsequently review the recorded calls. The system can also play back the recorded monitoring sessions. In addition, a similar technique logs all voice/data transactions with selected play back of the logged sessions.

Although the invention has been described with reference to the above-specified embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appended claims will cover such modifications that fall within the true scope of the invention.

What is claimed is:

1. A system for monitoring a plurality of service representatives in handling customer calls, comprising:
    a switching device operable to receive customer calls;
    a plurality of agent workstations coupled to the switching device, the agent workstations operable to receive customer calls from the switching device; and
    a platform coupled to the switching device, the platform operable to record customer calls as a plurality of logged sessions, the platform operable to determine service representative monitoring periods having scheduling criteria, the platform operable to select portions of the logged sessions that meet the scheduling criteria of the monitoring periods.

2. The system of claim 1, wherein the platform records customer calls irrespective of the scheduling criteria.

3. The system of claim 1, wherein the logged sessions comprise recordings of all customer calls received at the agent workstations.

4. The system of claim 1, wherein the platform comprises:
    a first memory operable to stored logged sessions;
    a second memory operable to store scheduling criteria; and
    a third memory operable to store play back information associated with the logged sessions, wherein the platform selects portions of the logged sessions stored in the first memory using scheduling criteria stored in the second memory and play back information stored in the third memory.

5. The system of claim 1, wherein the platform selects portions of the logged sessions while generating the logged sessions, the platform further operable to insert play back indicators into the logged sessions at the time of recording to specify the selected portions of the logged sessions.

6. The system of claim 1, further comprising a plurality of voice/data channels coupled to the platform and the switching device, the voice/data channels operable to communicate voice/data associated with the customer calls to the platform for recording.

7. The system of claim 1, wherein the platform is further operable to play back selected portions of the logged sessions.

8. The system of claim 1, wherein the scheduling criteria comprises a monitoring interval, a number of calls, and a monitoring length.

9. The system of claim 1, wherein the scheduling criteria comprises a random indicator.

10. A method for monitoring a plurality of service representatives in handling customer calls, comprising:
    recording customer calls as a plurality of logged sessions;
    determining monitoring periods for the service representatives, the monitoring periods having scheduling criteria; and
    selecting portions of the logged sessions that meet the scheduling criteria of the monitoring periods.

11. The method of claim 10, wherein the step of recording customer calls comprises recording customer calls irrespective of the scheduling criteria.

12. The method of claim 10, further comprising:
    storing play back information associated with the logged sessions; and
    selecting portions of the logged sessions using play back information and scheduling criteria.

13. The method of claim 10, wherein the step of selecting is performed while generating the logged sessions, and further comprising the step of inserting play back indicators into the logged sessions at the time of recording to specify the selected portions of the logged sessions.

14. The method of claim 10, further comprising the step of playing back selected portions of the logged sessions.

15. The method of claim 10, wherein the scheduling criteria comprises a monitoring interval, a number of calls, and a monitoring length.

16. The method of claim 10, wherein the scheduling criteria comprises a random indicator.

17. The method of claim 10, wherein the step of determining monitoring periods for the service representatives comprises:
    selecting a service representative;
    selecting a day of the week; and
    associating a monitoring period with the selected service representative on the selected day of the week.

18. The method of claim 10, wherein the step of determining monitoring periods for the service representatives comprises:

selecting a service representative;

selecting a day of the week; and associating a plurality of monitoring periods with the selected service representative on the selected day of the week.

19. The method of claim 10, wherein the step of recording customer calls comprises:

detecting the connection of a customer call;

opening a voice/data file associated with a service representative handling the customer call; and storing voice/data associated with the customer call in the voice/data file.

20. A platform for monitoring a plurality of service representatives in handling customer calls, comprising:

a plurality of voice/data channels operable to receive voice/data associated with customer calls;

a first memory operable to store voice/data associated with customer calls as logged sessions;

a second memory operable to store monitoring schedules for the service representatives, the monitoring schedules based on monitoring periods having scheduling criteria; and a processor coupled to the memory and operable to select portions of the logged sessions that meet the scheduling criteria of the monitoring periods.

21. The platform of claim 20, wherein the logged sessions comprise recordings of all customer calls received at the platform.

22. The platform of claim 20, further comprising a third memory coupled to the processor, the third memory operable to store play back information associated with the logged sessions, wherein the processor selects portions of the logged sessions stored in the first memory using scheduling criteria stored in the second memory and play back information stored in the third memory.

23. The platform of claim 20, wherein the processor selects portions of the logged sessions while generating the logged sessions, the processor further operable to cause the first memory to store play back indicators into the logged sessions at the time of recording to specify the selected portions of the logged sessions.

24. The platform of claim 20, further comprising a plurality of voice/data channels operable to communicate voice/data associated with the customer calls to the platform for recording.

25. The platform of claim 20, wherein the scheduling criteria comprises a monitoring interval, a number of calls, and a monitoring length.

26. The platform of claim 20, wherein the scheduling criteria comprises a random indicator.

* * * * *